(12) United States Patent
Koshinaka et al.

(10) Patent No.: US 12,067,098 B2
(45) Date of Patent: *Aug. 20, 2024

(54) PERSONAL AUTHENTICATION DEVICE, PERSONAL AUTHENTICATION METHOD, AND RECORDING MEDIUM

(71) Applicants: NEC Corporation, Tokyo (JP); NEC Platforms, Ltd., Kawasaki (JP)

(72) Inventors: Takafumi Koshinaka, Tokyo (JP); Kouji Oosugi, Tokyo (JP); Kohei Osugi, Kanagawa (JP)

(73) Assignees: NEC CORPORATION, Tokyo (JP); NEC Platforms, Ltd., Kanagawa (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/095,745

(22) Filed: Jan. 11, 2023

(65) Prior Publication Data

US 2023/0143028 A1 May 11, 2023

Related U.S. Application Data

(63) Continuation of application No. 16/608,281, filed as application No. PCT/JP2017/016914 on Apr. 28, 2017, now Pat. No. 11,586,716.

(51) Int. Cl.
*H04R 1/10* (2006.01)
*G06F 3/16* (2006.01)
(Continued)

(52) U.S. Cl.
CPC .............. *G06F 21/32* (2013.01); *G06F 3/165* (2013.01); *G10L 25/51* (2013.01); *H04R 1/08* (2013.01); *H04R 1/1016* (2013.01); *H04R 3/00* (2013.01);

(58) Field of Classification Search
CPC ...... H04R 29/004; H04R 3/00; H04R 1/1016; H04R 1/08
(Continued)

(56) References Cited

U.S. PATENT DOCUMENTS

| 7,529,379 B2 | 5/2009 | Zurek | G07C 9/37 381/328 |
| 8,187,202 B2 * | 5/2012 | Akkermans | G07C 9/37 382/115 |

(Continued)

FOREIGN PATENT DOCUMENTS

| JP | 2004-054496 A | 2/2004 |
| JP | 2005-032056 A | 2/2005 |
| WO | 2014/061578 A1 | 4/2014 |

OTHER PUBLICATIONS

International Search Report of PCT/JP2017/016914 dated Jul. 25. 2017 [PCT/ISA/210].
(Continued)

*Primary Examiner* — Disler Paul
(74) *Attorney, Agent, or Firm* — Sughrue Mion, PLLC

(57) ABSTRACT

Provided are a personal authentication device performing accurate authentication immediately follow insertion an earphone/microphone device to wear, and preventing spoofing after authentication. This device: detects contact of an earphone/microphone device with a propagation path constituting part of the head of a person; generates a first acoustical signal in an audible range upon detecting said contact; measures an acoustical signal resulting from propagation of the first acoustical signal; determines that first authentication of the person is successful if the measured propagated first acoustical signal satisfies predetermined conditions; generates a second acoustical signal in an inaudible range higher in frequency than said audible range; measures an acoustical signal resulting from propagation of (Continued)

the second acoustical signal; and performs second authentication in which, if the measured propagated second acoustical signal satisfies predetermined conditions, then it is determined that the person is the person to be authenticated, for whom the first authentication is successful.

10 Claims, 18 Drawing Sheets

(51) Int. Cl.
*G06F 21/32* (2013.01)
*G10L 25/51* (2013.01)
*H04R 1/08* (2006.01)
*H04R 3/00* (2006.01)

(58) Field of Classification Search
USPC .............................. 381/74, 58–59, 376, 380
See application file for complete search history.

(56) References Cited

U.S. PATENT DOCUMENTS

| | | |
|---|---|---|
| 8,652,040 B2 | 2/2014 | LeBoeuf .............. A61B 5/0059 |
| | | 600/301 |
| 9,838,811 B2 | 12/2017 | Pelosi .................. H04R 1/1016 |
| 10,708,680 B2 | 7/2020 | Campbell ................ H04R 1/10 |
| 10,867,019 B2* | 12/2020 | Yano ...................... G06F 21/32 |
| 10,937,407 B2* | 3/2021 | Goldstein ............ A61B 5/6817 |
| 10,987,005 B2 | 4/2021 | LeBoeuf ................ A61B 5/742 |
| 11,159,868 B2* | 10/2021 | Chun ................... H04R 1/1041 |
| 11,494,473 B2* | 11/2022 | Mukund ............... H04L 9/3231 |
| 11,693,939 B2* | 7/2023 | Lesso ................... H04R 1/1041 |
| | | 726/19 |
| 2009/0087003 A1 | 4/2009 | Zurek et al. |
| 2021/0134318 A1 | 5/2021 | Harvey ................. A61B 5/117 |

OTHER PUBLICATIONS

Witten Opinion of PCT/JP2017/016914 dated Jul. 25, 2017 [PCT/ISA/237].

* cited by examiner

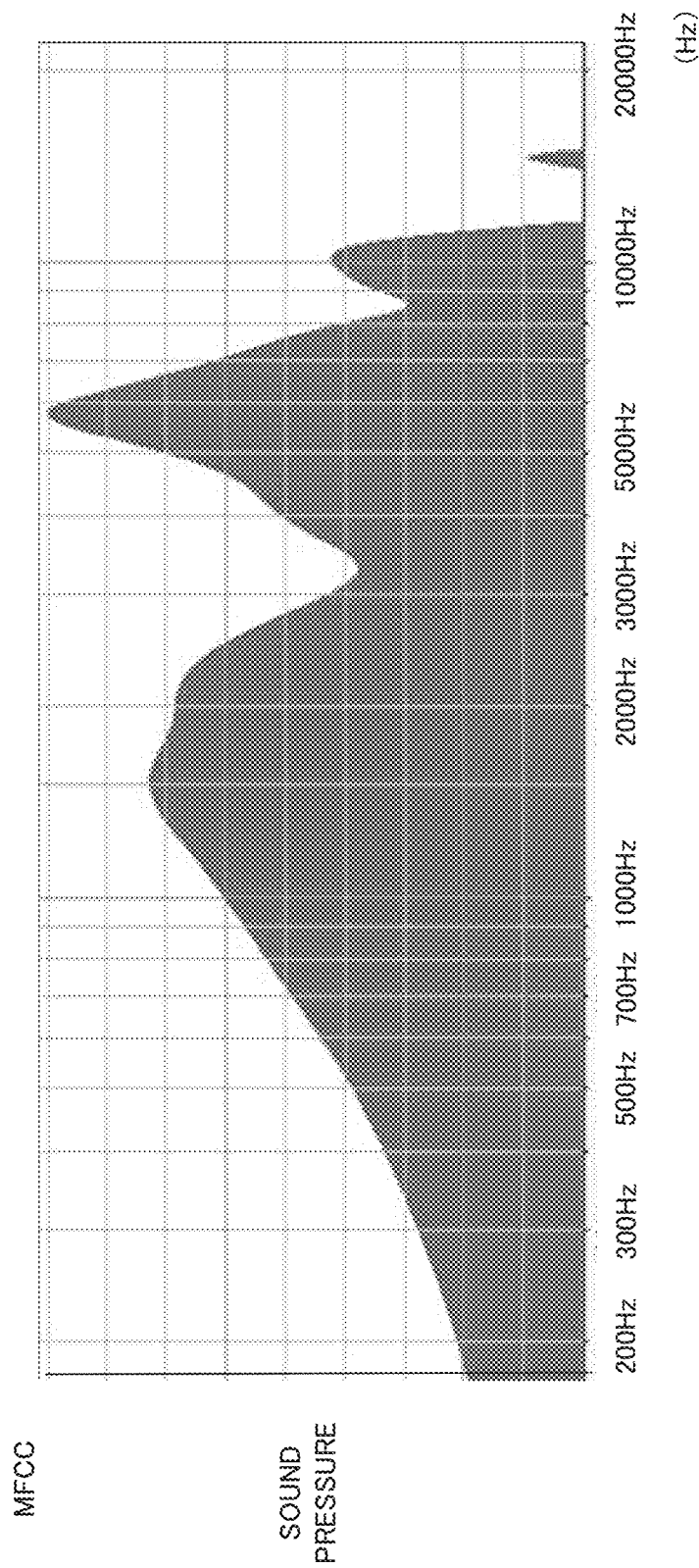

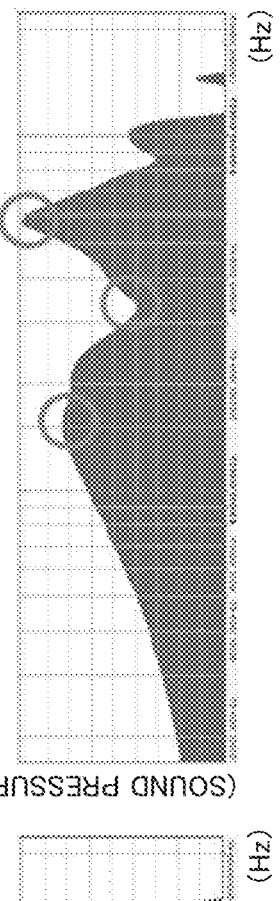
Fig. 12A MALE A (FIRST MEASUREMENT)
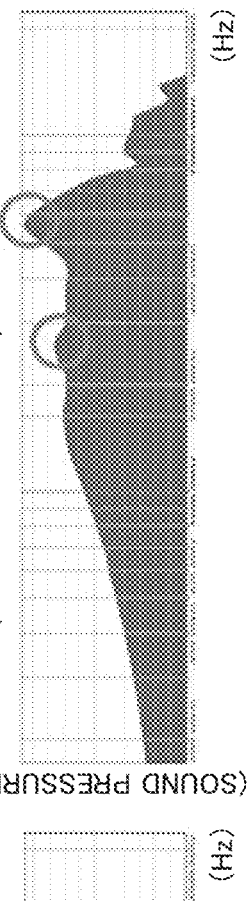
Fig. 12B MALE B (FIRST MEASUREMENT)
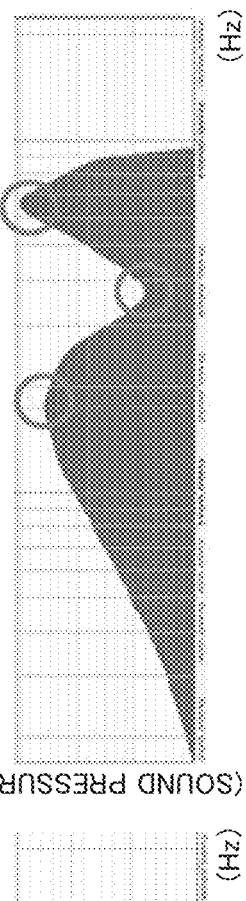
Fig. 12C FEMALE C (FIRST MEASUREMENT)
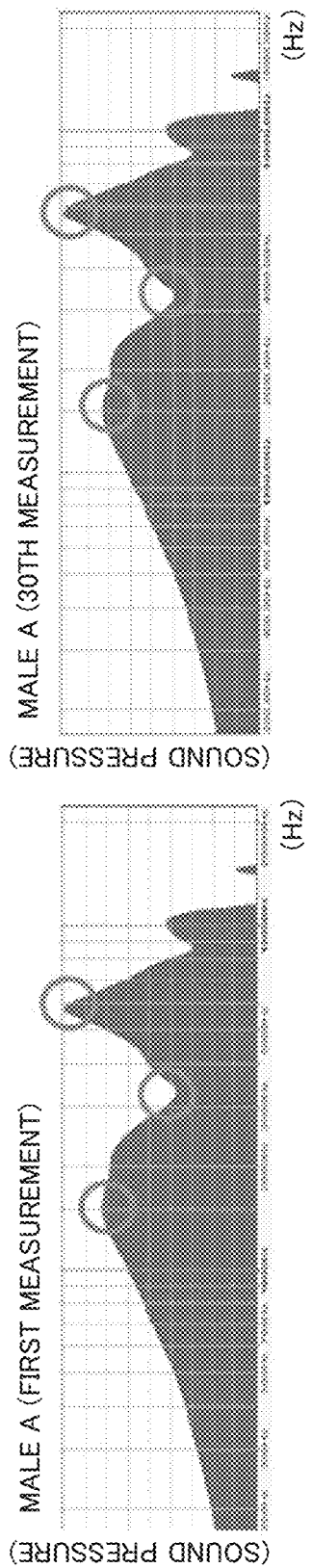
MALE A (30TH MEASUREMENT)
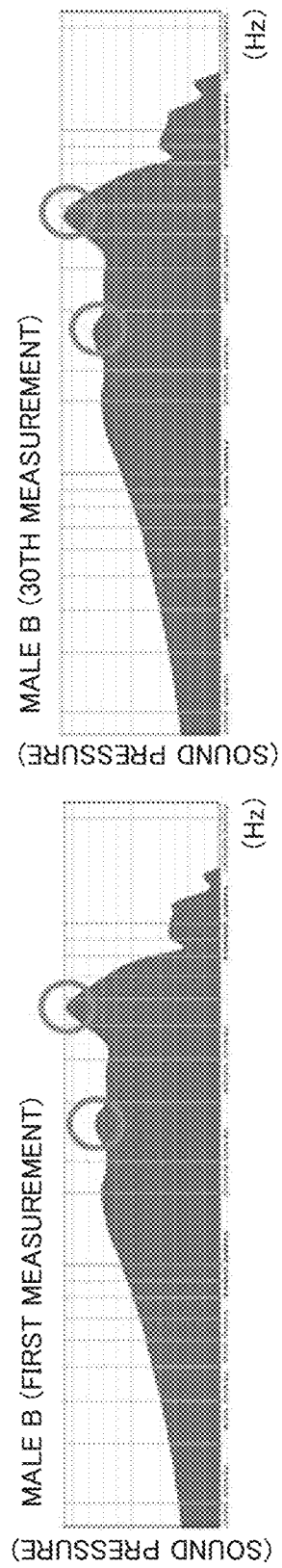
MALE B (30TH MEASUREMENT)
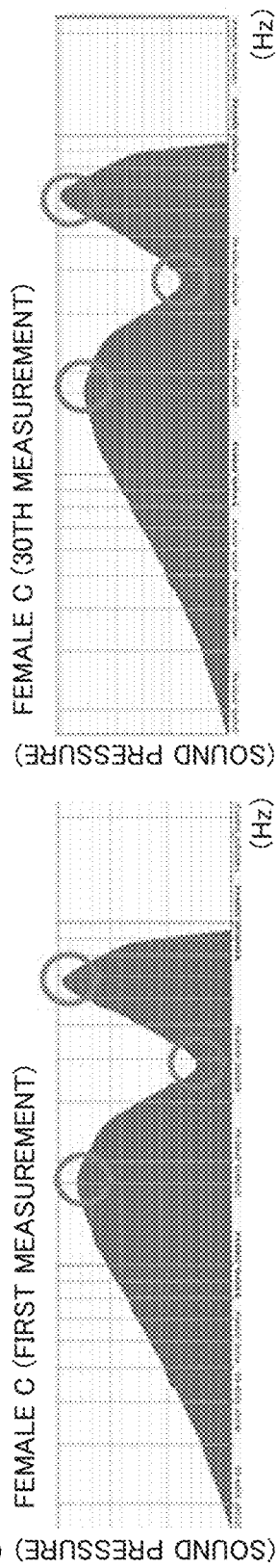
FEMALE C (30TH MEASUREMENT)

PERSONAL AUTHENTICATION DEVICE, PERSONAL AUTHENTICATION METHOD, AND RECORDING MEDIUM

CROSS REFERENCE TO RELATED APPLICATIONS

This application is a continuation application of U.S. patent application Ser. No. 16/608,281 filed on Oct. 25, 2019, which is a National Stage of International Application No. PCT/JP2017/016914, filed Apr. 28, 2017.

TECHNICAL FIELD

The present invention relates to a personal authentication device and the like for authenticating an individual.

BACKGROUND ART

Biometrics-based authentication has a lower risk of leakage or theft compared with a password and the like created by a user. For this reason, cases of introducing the biometrics-based authentication are increasing for the purpose of identifying an individual and confirming his/her rights, or protecting security. In biometrics-based authentication, techniques using, such as a living body, a fingerprint, a vein, a face, an iris, voice are generally known. Among them, personal authentication using voice can be performed by using a generally used inexpensive device such as a telephone or a microphone, instead of a special device.

Among biometrics authentication, personal authentication (otoacoustic authentication) using a change of an acoustical feature in an ear (an ear canal) has attracted attention in recent years. When personal authentication is performed by acquiring biometric information other than otoacoustic authentication, a user is requested to make some motions for the authentication. For example, in a case of personal authentication by using a fingerprint or a vein, a user required a motion such as putting a finger on a dedicated scanner. In a case of personal authentication by using a face or an iris, a use is required a motion such as pointing the face to a camera. In a case of personal authentication by using voice or bone conduction sound, a user is required a motion such as uttering a password. A user feels psychologically and physically loaded by forced to perform such a motion even in a short time. Further, continuing such a motion for a long time is not preferable because it prevents a user from making a next expected motion. In the case of the otoacoustic authentication, however, it is merely necessary to put an acoustic radio wave transceiver such as a handset or an earphone on an ear or insert it into an ear. Therefore, even in a long time, a psychological and physical burden of a user is less than other biometrics authentication methods. Techniques for the otoacoustic authentication are disclosed in PTLs 1 and 2.

CITATION LIST

Patent Literature

[PTL 1] International Publication No. WO2014/061578
[PTL 2] Japanese Unexamined Patent Application Publication No. 2005-032056

SUMMARY OF INVENTION

Technical Problem

The otoacoustic authentication disclosed in PTLs 1 and 2 has a problem that an acoustical feature of an ear canal is changeable. It is due to a vibration and a micromotion of an earphone/microphone device that occur at the time of insertion and removal of the device into and from an ear for transmitting and receiving an acoustical signal for authentication.

As for the problem of change in an acoustical feature, for example, when a user feels uncomfortable at an ear with inserted an earphone/microphone device, the device is re-inserted by the user. However it is difficult for the ordinary user to re-insert the earphone/microphone device in exactly the same position as the previous position. In many cases, the earphone/microphone device may be inserted at a slightly shifted position from the previously inserted one. Due to the displacement of the inserted position, an acoustical signal to be bounced off the ear canal changes and therefore it makes accurate authentication difficult based on the acoustical signal.

Furthermore, PTL 2 has a problem that extra authentication means (e.g., an input of a user ID) is required in order to authenticate with high accuracy. For example, when a user ID is required, forgetting his/her user ID makes authentication impossible. In a case of quick accessing highly confidential information at an emergency site (e.g., at an accident site or inside an ambulance), environmental situation, for instance, rain, a gust of wind, vibration caused by such as an earthquake might interfere with the user ID entry on the site using a keyboard. Taking time to input a user ID may prevent a quick access to the information. Further, a mouse or a keyboard for inputting a user ID is separately required.

In view of the above-described problems, an object of the present invention is to provide a personal authentication device and the like that are able to quickly perform highly accurate authentication and prevent spoofing after authentication.

Solution to Problem

In view of the above problems, a first aspect of the present invention is a personal authentication device. The device includes:
  sensor means that detects a contact with a propagation path being a part of a head of a person to be authenticated;
  acoustical signal generation means that generates, when the sensor means detects the contact, a first acoustical signal including an audible range, and generates a second acoustical signal in an inaudible range having a higher frequency than the audible range;
  acoustical signal measurement means that measures an acoustical signal after the first acoustical signal propagates a part of the head and measures an acoustical signal after the second acoustical signal propagates a part of the head; and
  identification means that performs first authentication of the person to be authenticated when the measured first acoustical signal satisfies a predetermined condition, and when the second acoustical signal satisfies a predetermined condition after the first authentication, performs second authentication for determining whether a person to be authenticated successful in the first authentication is a same person.

A second aspect of the present invention is a personal authentication method. The method includes:
  detecting a contact with a propagation path being a part of a head of a person to be authenticated;
  generating, when detecting the contact, a first acoustical signal including an audible range;

measuring an acoustical signal after the first acoustical signal propagates the propagation path;

generating a second acoustical signal in an inaudible range having a higher frequency than the audible range;

measuring an acoustical signal after the second acoustical signal propagates the propagation path;

performing, when the measured first acoustical signal satisfies a predetermined condition, first authentication of the person to be authenticated; and performing, when the second acoustical signal satisfies a predetermined condition after the first authentication, second authentication for determining whether a person to be authenticated successful in the first authentication is a same person.

A third aspect of the present invention is a personal authentication program to causes a computer to perform instructions. The program includes:

detecting a contact with a propagation path being a part of a head of a person to be authenticated;

generating, when detecting the contact, a first acoustical signal including an audible range;

measuring an acoustical signal after the first acoustical signal propagates the propagation path;

generating a second acoustical signal in an inaudible range having a higher frequency than the audible range;

measuring an acoustical signal after the second acoustical signal propagates the propagation path;

performing, when the measured first acoustical signal satisfies a predetermined condition, first authentication of the person to be authenticated; and performing, when the second acoustical signal satisfies a predetermined condition after the first authentication, second authentication for determining whether a person to be authenticated successful in the first authentication is a same person.

The personal authentication program can be stored in a non-transitory computer readable storage medium.

Advantageous Effects of Invention

The present invention is able to provide a personal authentication device and the like capable of quickly performing highly accurate authentication and preventing spoofing after authentication.

BRIEF DESCRIPTION OF DRAWINGS

FIG. 11 is a graph illustrating a spectrum envelope.

FIG. 12A is a graph illustrating spectrum envelopes of a person.

FIG. 12B is a graph illustrating spectrum envelopes of a person.

FIG. 12C is a graph illustrating spectrum envelopes of a person.

EXAMPLE EMBODIMENT

In general, a range of frequency audible to human beings (an audible range) is around 20 Hz at low sound and around 20 kHz at high sound. These sounds audible to human beings are referred to as an "audible sound", a high sound inaudible to human ears is referred to as an "ultrasound" (hereinafter, also referred to as "inaudible sound"), and a low sound inaudible to human ears is referred to as "infrasound". The frequency of sound to be heard clearly by human beings is around 2 kHz to 4 kHz.

According to the present example embodiment, the audible sound and the inaudible sound are used for otoacoustic authentication. Generally, a user feels uncomfortable when the user must listen to an undesired audible sound for authentication for a long time or the user must listen to the audible sound at every certain time interval. For this reason, there is an opinion that an inaudible sound for the otoacoustic authentication may reduce a burden on a user (see PTL 2).

However, the inventors of the present invention have discovered that, even though an acoustical feature of an ear canal changes due to insertion and removal of an earphone/microphone device into and from an ear which transmits and receives an acoustical signal, an acoustical feature in the audible range is stable compared with the inaudible range (described in detail later). Each example embodiment of the present invention is devised based on this idea.

Hereinafter, each example embodiment of the present invention is described with reference to the drawings. In the following description of the drawings, a same or similar component is assigned with a same or similar reference sign. However, the drawings schematically illustrate configurations according to the example embodiments of the present invention. Further, the example embodiments of the present invention described below are examples, and can be modi- First Example Embodiment (Personal Authentication Device)

Figure 1:
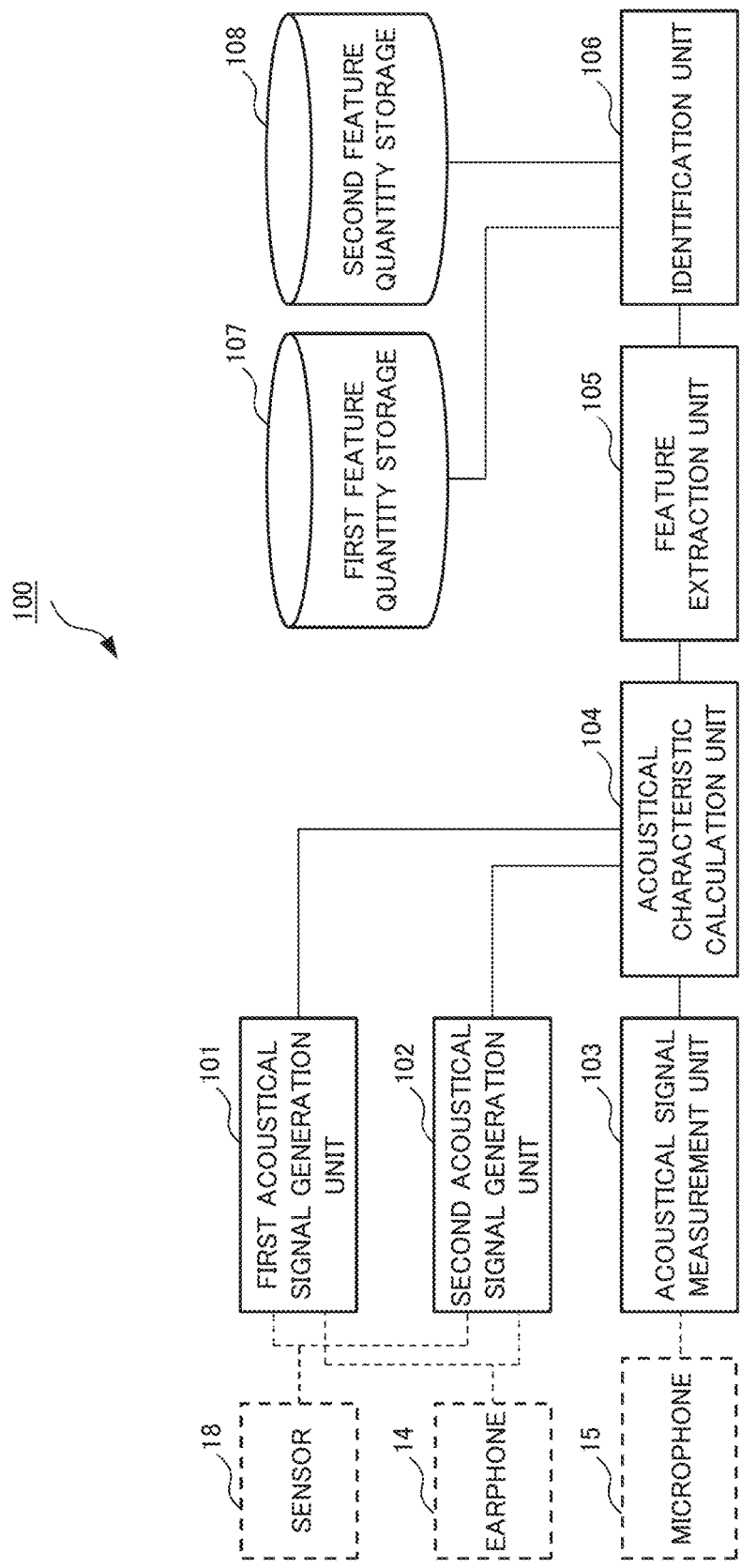
FIG. 1 is a block diagram illustrating a configuration example of a personal authentication device according to a first example embodiment of the present invention.

As illustrated in FIG. 1, personal authentication device 100 according to a first example embodiment of the present invention includes first acoustical signal generation unit 101, second acoustical signal generation unit 102, acoustical signal measurement unit 103, acoustical characteristic calculation unit 104, feature extraction unit 105, identification unit 106, first feature quantity storage 107, and second feature quantity storage 108.

First acoustical signal generation unit 101 generates an acoustical signal (a first acoustical signal) in the audible range. Earphone 14 inputs this first acoustical signal and transmits the first acoustical signal to a propagation path being a part of a head of a user (a person to be authenticated). Herein, the part of a head to which the acoustical signal is transmitted is a cavity inside the head and a region formed in such a way as to have an opening toward an outside, for example, typically an ear canal of an auditory organ. In addition, it may be a nasal cavity. It may be a cavity inside a head without an opening toward an outside. Further, it may be at least a part of a region to which an apparatus for expressing an acoustical effect can be attached or approached.

Second acoustical signal generation unit 102 generates an acoustical signal (a second acoustical signal) in the inaudible range (range of ultrasound) of which frequency is higher than the frequency in the audible range. Earphone 14 inputs this second acoustical signal and transmits the second acoustical signal to the above-described propagation path being the part of the user's head. It is desirable that the inaudible range is an inaudible range having a frequency higher than a frequency in the audible range. This is to prevent a user from being stressed by the occurrence of an audible sound in second authentication.

Acoustical signal measurement unit 103 inputs an output signal by microphone 15 provided on earphone 14. Then, acoustical signal measurement unit 103 measures the first acoustical signal after the acoustical signal in the audible range transmitted from first acoustical signal generation unit 101 propagates the part of the user's head. Further, acoustical signal measurement unit 103 also measures the second acoustical signal after the acoustical signal in the inaudible range transmitted from second acoustical signal generation unit 102 propagates the part of the user's head. Note that it is preferable that second acoustical signal generation unit 102 generates the second acoustical signal after acoustical signal measurement unit 103 measures the first acoustical signal.

A part of a head referred to as the propagation path for the first and second acoustical signals may be, more specifically, at least a part of a skull, a brain, a sensory organ and a cavity therebetween constituting a head. Further, the acoustical signal after the propagation includes a signal reflected in the propagation path.

Further, first acoustical signal generation unit 101 and second acoustical signal generation unit 102 are illustrated as separate units in FIG. 1, however, these units may be an identical unit or device.

Acoustical characteristic calculation unit 104 calculates an acoustical characteristic (a first acoustical characteristic) of the first acoustical signal that propagates the part of the user's head, based on the first acoustical signal measured by acoustical signal measurement unit 103. Further, acoustical characteristic calculation unit 104 calculates an acoustical characteristic (a second acoustical characteristic) of the second acoustical signal that propagates the part of the user's head, based on the second acoustical signal measured by acoustical signal measurement unit 103.

Feature extraction unit 105 calculates, from the calculated first acoustical characteristic, a feature quantity (a first feature quantity) with regard to the user whose acoustical signal is propagated. Further, feature extraction unit 105 calculates, from the calculated second acoustical characteristic, a feature quantity (a second feature quantity) with regard to the user whose acoustical signal is propagated.

First feature quantity storage 107 stores at least one of the first acoustical characteristic and the first feature quantity associated with a predetermined user. The number of users may be single or plural. Second feature quantity storage 108 stores at least one of the second acoustical characteristic and the second feature quantity associated with the predetermined user. In other words, the two feature quantities (the first and second acoustical characteristics or the first and second feature quantities) associated with one user are stored in the two storages (first feature quantity storage 107 and second feature quantity storage 108). Hereinafter, the user whose acoustical characteristic and feature quantity are stored in first feature quantity storage 107 and second feature quantity storage 108 may be referred to as a registered user. Note that, in FIG. 1, first feature quantity storage 107 and second feature quantity storage 108 are illustrated as being stored in separate storage medium, however, these units may be stored in one storage medium. Further, these units may be set to be connectable to the storage medium via a wireless or wired line. In addition, user identification is possible by using any of an acoustical characteristic and a feature quantity. In the following, an example in which authentication is mainly performed by using a feature quantity is described.

Identification unit 106 determines, when the measured first acoustical signal satisfies a predetermined condition, that first authentication of the user (the person to be authenticated) is successful. Then, identification unit 106 performs, when the second acoustical signal satisfies a predetermined condition, second authentication for determining whether the user (the person to be authenticated) of whom the first authentication is successful is the same person. For example, identification unit 106 compares the first feature quantity extracted by feature extraction unit 105 with the first feature quantity of the registered user stored in first feature quantity storage 107. Then, identification unit 106 determines, based on the comparison result (first authentication), whether the user to be authenticated is the registered user. Further, identification unit 106 compares the second feature quantity extracted by feature extraction unit 105 with the feature quantity of the registered user stored in second feature quantity storage 108. Then, identification unit 106 determines, based on the comparison result (second authentication), whether swapping identities (spoofing) of the registered user has not occurred. In general, the first feature quantity has higher authentication accuracy, however, a user feels easily uncomfortable since the first feature quantity is in the audible range. Therefore, identification unit 106 performs the initial first authentication of the user immediately after the user inserts an earphone/microphone device (contacts with the propagation path), based on the first feature quantity. This is because, immediately after the insertion of the earphone/microphone device, an audible sound for a few seconds can be accepted without stress by the user as a signal that authentication processing has properly started. Further, a sound wave in the audible range has robustness to a vibration and a micromotion at the time of insertion, and authentication accuracy is high, and therefore, it is possible to determine with high reliability whether or not a user to be authenticated is a registered user.

Identification unit 106 performs the second authentication, based on the second feature quantity. This is because it is considered that a user may be doing some processing or listening to another sound while using an earphone/microphone device, and the authentication by the audible sound may interrupt the user's concentration or the user may feel stress upon authentication. Further, for the user of whom the initial authentication processing is successful, even the authentication by an inaudible sound (ultrasound) can be an authentication with accuracy sufficient to determine spoofing and the like.

Note that identification unit 106 may permit, when a result of the first authentication is successful or when results of the first authentication and the second authentication immediately after the first authentication are successful, a predetermined access. Then, identification unit 106 may continue, when a result of the second authentication performed after the second authentication immediately after the first authentication is successful, permission of the predetermined access. This enables the security of the initial access permission to be more secure.

Configuration Example of a Personal Authentication Device

Figure 2:
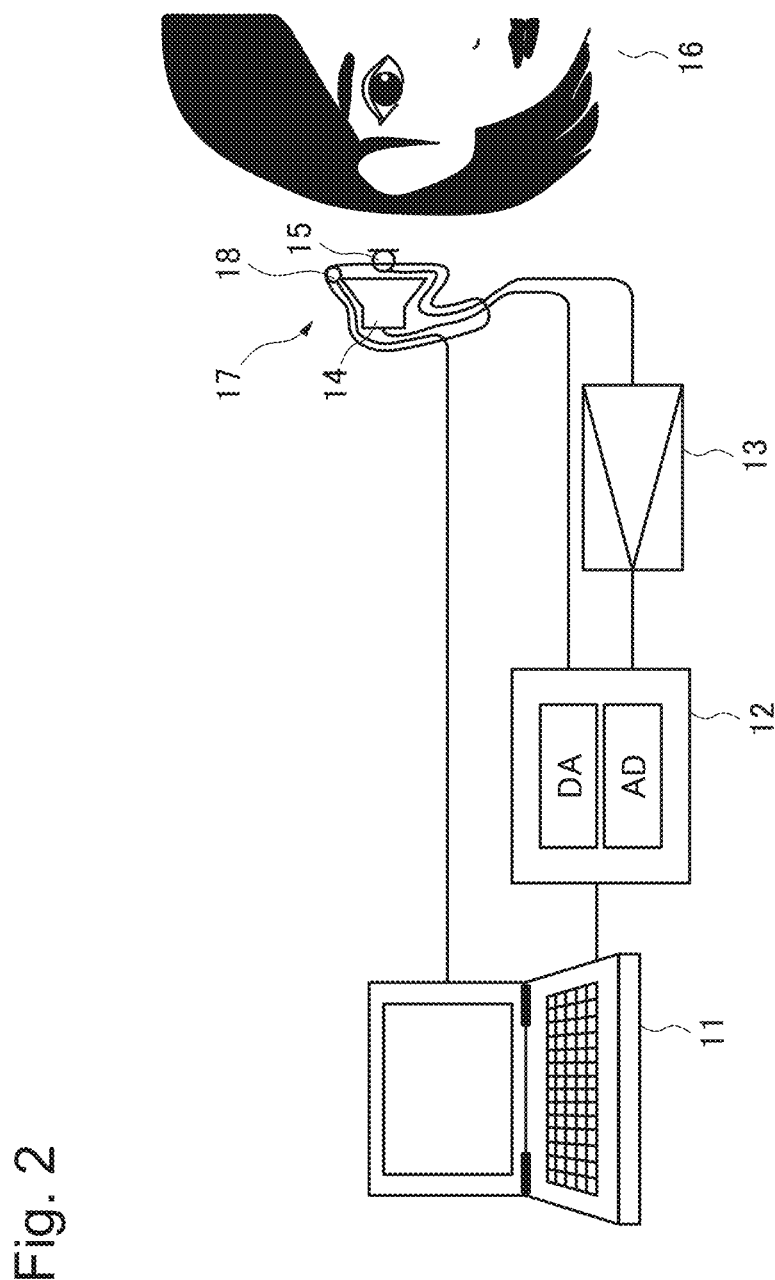
FIG. 2 is a configuration diagram illustrating a specific configuration example of the personal authentication device according to the first example embodiment.

FIG. 2 is a diagram illustrating a specific configuration example of the personal authentication device according to the present example embodiment. The personal authentication device illustrated in FIG. 2 includes personal computer (PC) 11, sound processor 12, microphone amplifier 13, earphone 14, microphone 15 (referred to as earphone 14 and microphone 15 together as earphone/microphone device 17), and sensor 18. Note that reference sign 16 represents a user to be recognized.

Earphone 14 outputs the acoustical signal to be transmitted by above-described first acoustical signal generation unit 101 and second acoustical signal generation unit 102. Further, microphone 15 receives the acoustical signal and outputs the acoustical signal to acoustical signal measurement unit 103. Note that, as illustrated in FIG. 2, it is desirable that microphone 15 and earphone 14 are integrated in such a way that relative positional relation does not change. However, this may not apply when the relative positional relation between microphone 15 and earphone 14 do not change significantly. Earphone/microphone device 17 is held in a contact state, a press-contacting state, or a substantially fitting state on a piece of the propagation path of the acoustical signal. In the example illustrated in FIG. 2, as a configuration example of earphone 14, microphone 15, and sensor 18, earphone/microphone device 17 in which these are integrated is cited. This earphone/microphone device 17 is inserted into the entrance of an ear canal. Sensor 18 detects a contact with a propagation path being a part of a head of a person to be authenticated. Sensor 18 is typically a sensor capable of determining whether a user wears such earphone/microphone device 17 on the body, such as a temperature detection sensor, an optical sensor, or a touch sensor.

In addition to the above-described example, earphone/microphone device 17 may be achieved by a device in which a microphone is provided on a headphone of a type covering auricles (over-ear type microphone-integrated earphone/microphone device). Further, earphone/microphone device 17 may be achieved by a telephone provided with a microphone on a receiver part. In such a case, functions may be divided into right and left sides in such a way that an acoustical signal transmitted from earphone 14 located at the ear canal entrance or the like on the left ear is measured with microphone 15 located at the ear canal entrance or the like on the right ear, or vice versa.

Acoustical characteristic calculation unit 104, feature extraction unit 105, and identification unit 106 are each achieved by a central processing unit (CPU) and a memory which operate according to a personal authentication program included in PC 11. A specific configuration example of PC 11 is described later (see FIG. 18). Further, first feature quantity storage 107 and second feature quantity storage 108 are achieved by a storage medium such as a hard disk included in PC 11.

Figure 3:
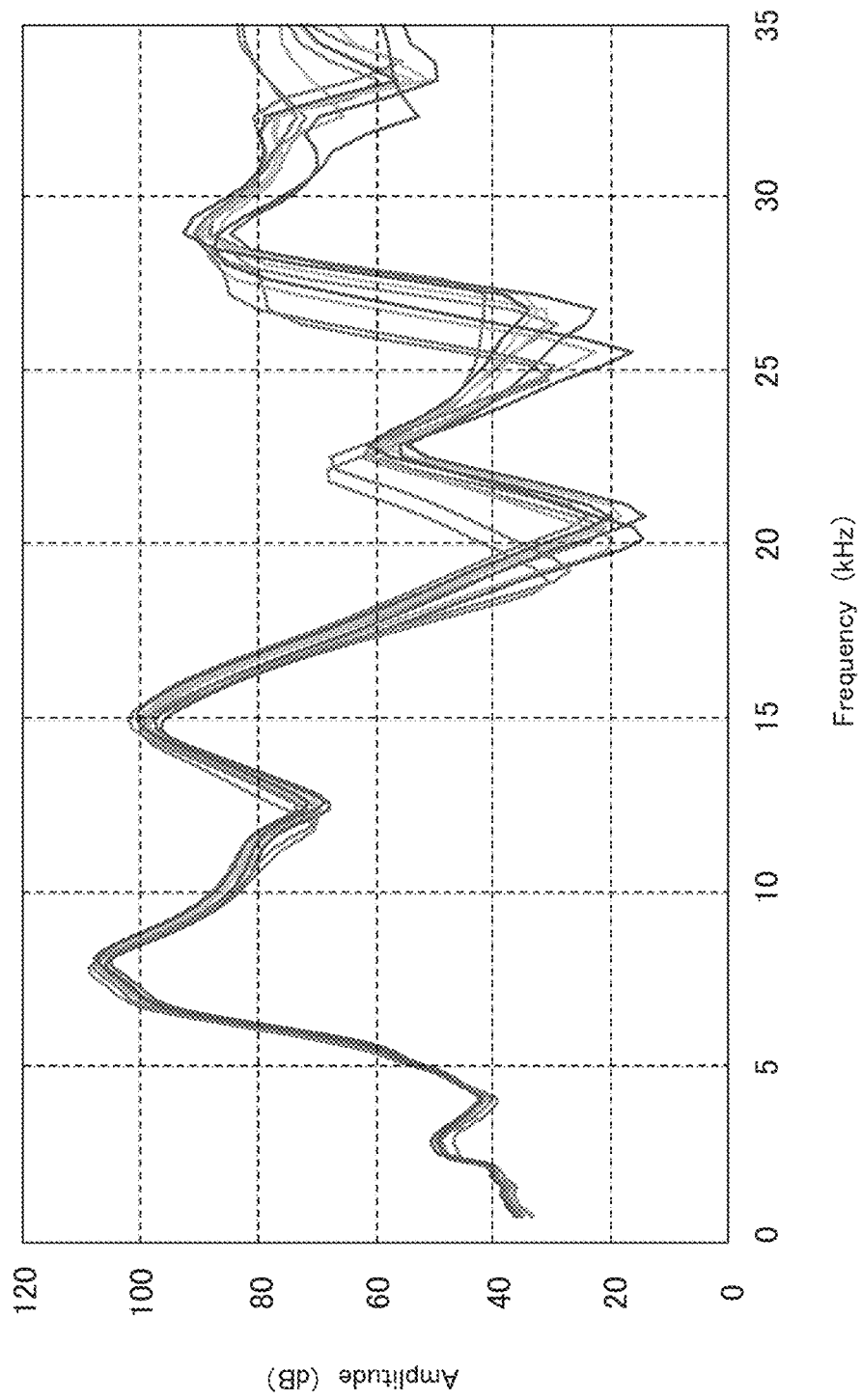
FIG. 3 is a graph illustrating an ear canal transfer function (ECTF).

Next, a difference in robustness of authentication between the audible range and the inaudible range is described. FIG. 3 is a graph illustrating an ear canal transfer function (ECTF) when a same person repeatedly inserts and removes earphone/microphone device 17 into and from the same ear ten times. The vertical axis of the graph indicates amplitude (dB: decibel) of a sound wave, and the horizontal axis indicates a frequency (Hz: hertz). Referring to FIG. 3, the graphs of the ECTF overlap at a high rate in a frequency range approximately between 0 kHz and 20 kHz, even though the insertion and removal are repeated. In other words, the ECTF has high robustness (reproducibility) with regard to a micromotion of the inserted position of earphone/microphone device 17. Note that, as illustrated by the graph, the reproducibility of the ECTF gradually decreases in a frequency range greater than 20 kHz. Since a high sound range of the audible sound is around 20 kHz as described above, in the ECTF, an audible sound is not influenced by a motion for insertion and removal compared with an inaudible sound, and it can be said that an authentication rate is high. Note that, in general, the authentication success rate in the audible range is about 97%, and the authentication success rate in the inaudible range is about 90%. Therefore, combining authentication results of these audible range and inaudible range enables a user to bear less burden than authentication only in the audible range. Further, the combination of the authentication results enables acquiring an authentication result with higher accuracy than an authentication result only in the inaudible range.

(Operation of Personal Authentication Device)

Next, an operation of personal authentication device 100 according to the first example embodiment is described. The operation of the present example embodiment is divided into "1. user registration" and "2. user identification".

Figure 4:
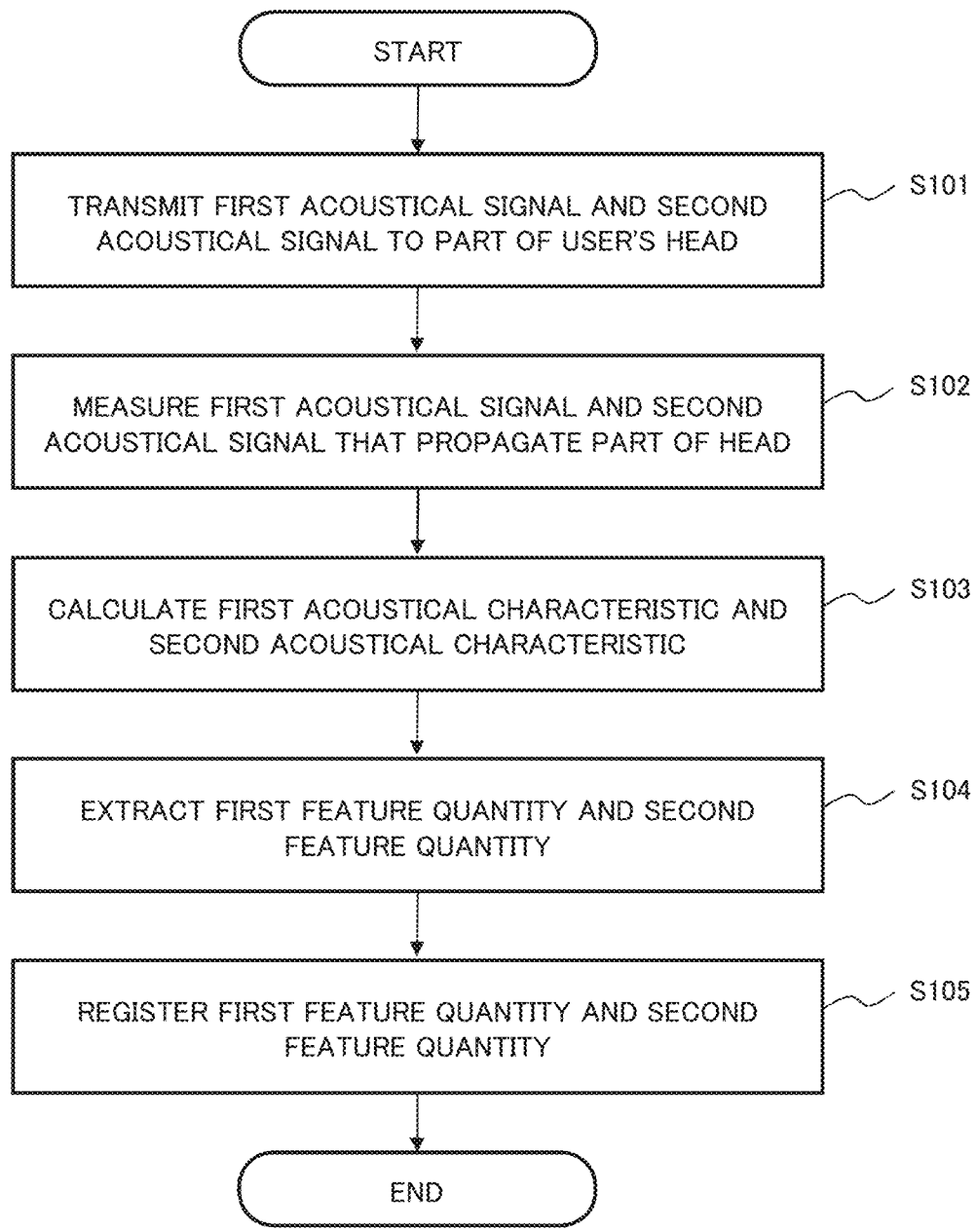
FIG. 4 is a flowchart illustrating an operation of a user registration in the personal authentication device according to the first example embodiment.

Hereinafter, the operation of "1. user registration" is described with reference to the flowchart illustrated in FIG. 4. Note that identification unit 106 performs determination whether to be user registration or user identification. For example, when a coincident feature quantity is not stored in first feature quantity storage 107 or when earphone/microphone device 17 is powered on, identification unit 106 determines that it is processing of the user registration. The user registration processing is also determined when acoustical signal measurement unit 103 detects, by a change in the acoustical signal, insertion of earphone/microphone device 17 by a user, or the like. Note that the determination method is not limited to these examples.

Figure 5:
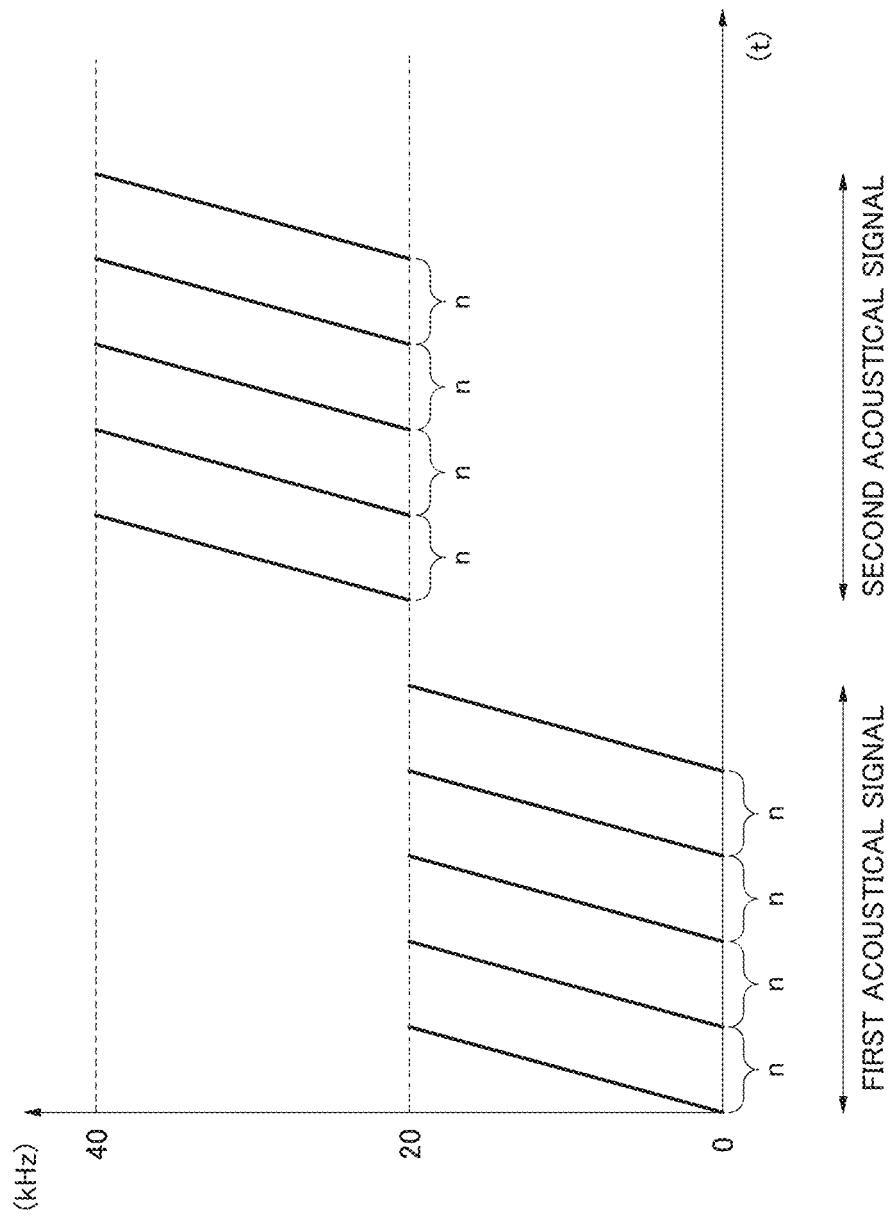
FIG. 5 is a chart illustrating a transmission timing of an acoustical signal to be transmitted.

First, in step S101, first acoustical signal generation unit 101 generates a first acoustical signal and outputs the generated first acoustical signal from earphone 14. Next, second acoustical signal generation unit 102 generates a second acoustical signal and transmits the generated second acoustical signal from earphone 14. FIG. 5 is a chart schematically illustrating a timing for transmitting the first acoustical signal and the second acoustical signal. The vertical axis of the graph indicates a frequency (kHz), and the horizontal axis indicates time (t). First, first acoustical signal generation unit 101 transmits, toward a part of a user's head to be authenticated, the first acoustical signal in the audible range multiple times at every predetermined interval (n). This is because it is preferable to transmit the signal multiple numbers of times from the viewpoint of accuracy. In FIG. 5, first acoustical signal generation unit 101 transmits the first acoustical signal of which frequency is from a minimum as an audible sound (illustrated as 0 kHz in FIG. 5 for simplification of explanation) to 20 kHz five times at every 0.2 seconds.

Then, similarly to above-described first acoustical signal generation unit 101, second acoustical signal generation unit 102 transmits, toward the part of the user's head to be authenticated, the second acoustical signal in the inaudible range multiple times at every predetermined interval (n). In FIG. 5, for example, second acoustical signal generation unit 102 transmits the second acoustical signal from 20 kHz to 40 kHz five times at every 0.2 seconds.

Note that it is preferable that the first acoustical characteristic and the first feature quantity are extracted in the audible range, and the second acoustical characteristic and the second feature quantity are extracted in the inaudible range. However, it is not necessarily limited thereto. This is because, depending on a shape of a head or the like of a user to be authenticated or a type of an acoustical signal and feature quantity to be used, a frequency range in which a highly accurate acoustical signal and feature quantity can be extracted may differ. Therefore, a designer may set a band in which an acoustical characteristic or the like can be calculated with high accuracy in the audible range and the inaudible range.

Figure 6:
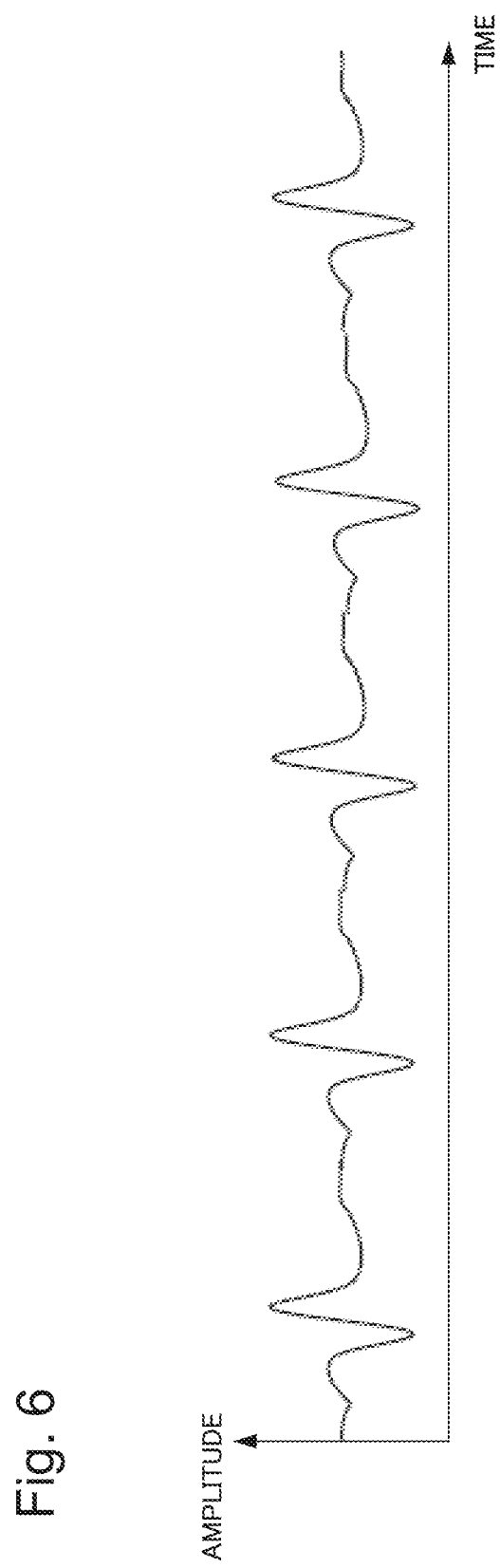
FIG. 6 is a graph schematically illustrating a waveform of the acoustical signal to be transmitted.

FIG. 6 is a graph schematically illustrating a waveform of the acoustical signals (the first acoustical signal and the second acoustical signal) to be transmitted in a time area expression. The vertical axis represents amplitude of a signal value of an acoustical signal measured at time t, and the horizontal axis represents time t. The acoustical signals generated by first acoustical signal generation unit 101 and second acoustical signal generation unit 102 may be transmitted, for example, from an entrance of ear canal toward the ear canal. At this time, a maximal length sequence signal, a time stretched pulse (TSP) signal, or the like which are widely used for a purpose of measuring an impulse response may be used for these acoustical signals.

Note that set values of the transmission interval and the sound range (the frequency) are one example, and can be modified as appropriate according to a device to be used, application, and the like.

In step S102, acoustical signal measurement unit 103 measures the first acoustical signal after the part of the user's head to be authenticated is propagated. Similarly, acoustical signal measurement unit 103 measures the second acoustical signal after the part of the user's head to be authenticated is propagated.

Figure 7:
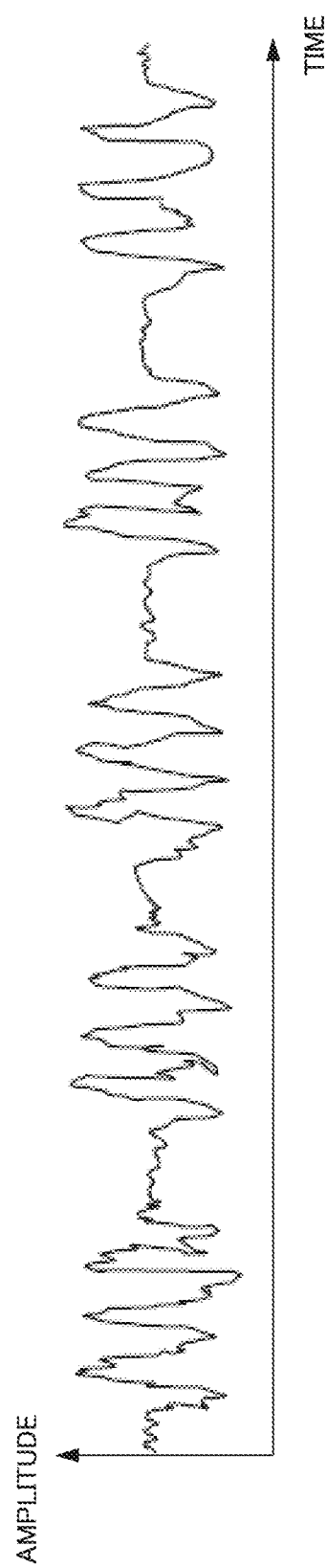
FIG. 7 is a graph schematically illustrating a waveform of an acoustical signal to be measured.

FIG. 7 is a graph schematically illustrating a waveform of the acoustical signals (the first acoustical signal and the second acoustical signal) to be measured in a time area expression. In the graph, the vertical axis represents a signal value (amplitude) of an acoustical signal measured at time t, and the horizontal axis represents time (t). During the propagation in an ear canal, the first acoustical signal to be measured changes as the graph illustrated in FIG. 6 into the graph illustrated in FIG. 7. This change occurs due to the influence of noises caused inside the body such as a heartbeat sound, a motion sound (an arthrosound and a muscle sound), a breath sound, and a vocalized sound.

Figure 8:
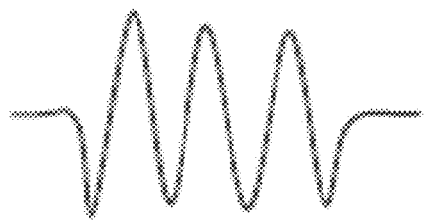
FIG. 8 is a graph illustrating one example of a waveform of a signal after synchronous addition processing.

Further, acoustical signal measurement unit 103 performs synchronous addition processing and removes noises in the measured acoustical signals (the first acoustical signal and the second acoustical signal). FIG. 8 illustrates a waveform of the signal after the synchronous addition processing in 0.2 seconds described above.

In step S103, acoustical characteristic calculation unit 104 compares the transmitted first acoustical signal (see FIG. 6) with the measured first acoustical signal (including the signal after the synchronous addition processing) (see FIGS. 7 and 8). Then, acoustical characteristic calculation unit 104 calculates, from these changes, the acoustical characteristic (the first acoustical characteristic) when the first acoustical signal propagates the part of the user's head. Similarly, acoustical characteristic calculation unit 104 compares the transmitted second acoustical signal (see FIG. 6) with the measured second acoustical signal (including the signal after the synchronous addition processing) Then, acoustical characteristic calculation unit 104 (see FIGS. 7 and 8). calculates, from these changes, the acoustical characteristic (the second acoustical characteristic) when the second acoustical signal propagates the part of the user's head.

The acoustical characteristics (the first acoustical characteristic and the second acoustical characteristic) are a characteristic to represent, when transmitting the acoustical signal, how the transmitted acoustical signal propagates a target (which is a part of a user's head in the present invention) and is measured. The acoustical signal to be measured varies depending on the transmitted signal. However, in principle, a measurement signal for any transmission signal can be calculated by acquiring a signal to be measured when transmitting a sudden and very short acoustical signal called an impulse signal. Therefore, a signal to be measured for an impulse signal, i.e., an impulse response is a typical acoustical characteristic. Further, a transfer function (TF) which is acquired by applying Fourier analysis to the impulse response is also a typical acoustical characteristic. It is preferable that the acoustical characteristic includes information on how the acoustical signal is reflected and/or attenuated in a living body.

Figure 9:
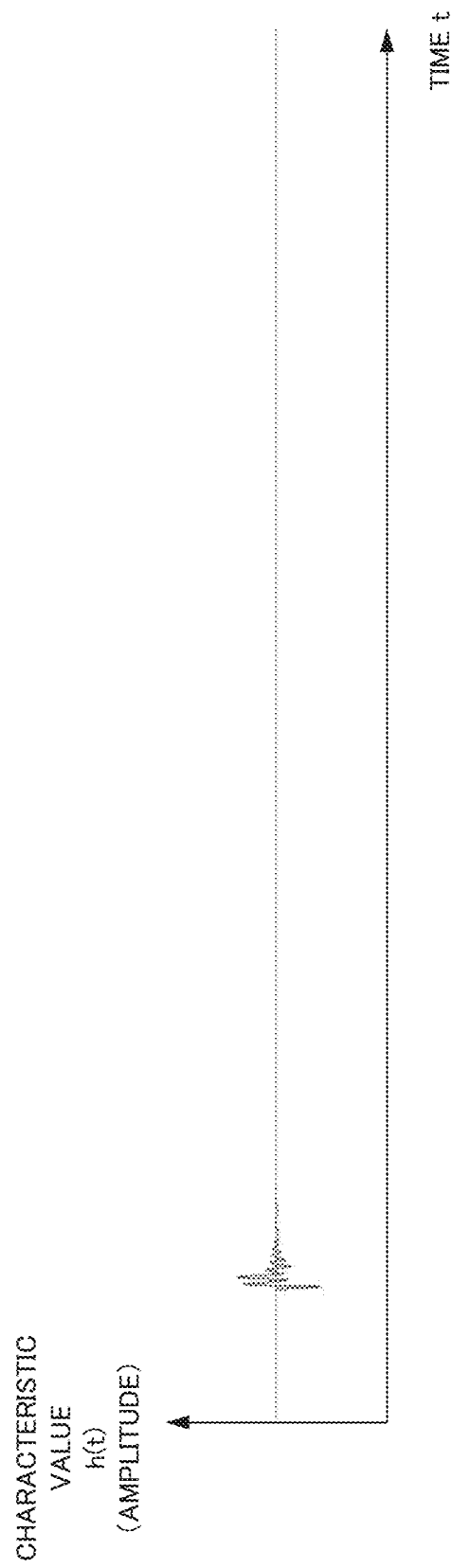
FIG. 9 is a graph illustrating one example of an impulse response as an acoustical characteristic.

In the following description, it is assumed that the propagation path is an ear canal. FIG. 9 is a graph of an ear canal impulse response (ECIR) illustrating the acoustical characteristic calculated by acoustical characteristic calculation unit 104 in a time area expression. The graph illustrated in FIG. 9 indicates that the horizontal axis represents time t and the vertical axis represents a value h (t) of the ear canal impulse response of the measured acoustical signal at time t. Note that there is relation indicated by the following equation (1) among a signal value x (t) of the acoustical signal to be transmitted, a signal value y (t) of the acoustical signal to be measured after propagation, and a value h (t) of the ear canal impulse response. Herein, τ is a shift coefficient.

[Equation 1]

$$y(t) = h(t) * x(t) = \int_{-\infty}^{\infty} h(\tau) x(t-\tau) d\tau \quad (1)$$

Figure 10:
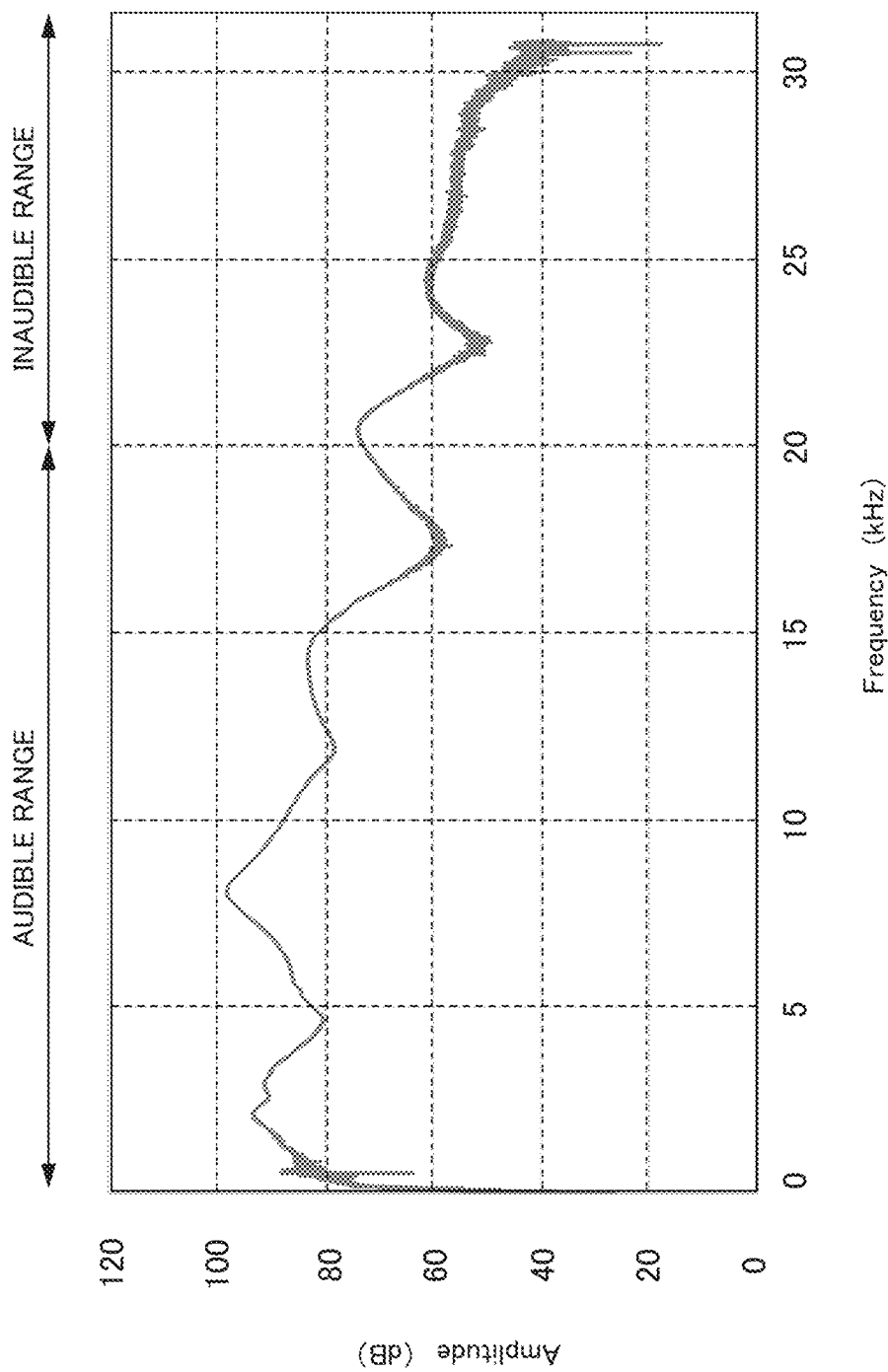
FIG. 10 is a graph illustrating the acoustical characteristic by the ear canal transfer function (ECTF).

The acoustical characteristic may be the ear canal transfer function (ECTF). FIG. 10 is a graph of the ECTF representing the acoustical characteristic illustrated in FIG. 9 in a frequency region. In the graph, the vertical axis represents amplitude (dB) and the horizontal axis represents a frequency (kHz). In the graph, it can be seen that a plurality of maxima (peaks) and minima (valleys) are clearly measured in the audible range, compared with the inaudible range.

In step S104, feature extraction unit 105 calculates the feature quantity (first feature quantity) from the first acoustical characteristic calculated by acoustical characteristic calculation unit 104.

Herein, the feature quantities (first feature quantity and second feature quantity described later) are a numerical value useful for required processing (personal authentication in the present invention) extracted by applying some processing to the acoustical signal. The feature quantity is also referred to as an acoustical feature quantity. For example, mel-frequency cepstrum coefficients (MFCC) widely used for speech recognition are a typical acoustical feature quantity. The MFCC is acquired by applying processing such as Fourier analysis, logarithmic transformation, mel conversion, and discrete cosine transform with regard to the acoustical signal. The MFCC represents a vocal tract characteristic while considering speech perception of human beings. Note that the ECTF is acquired by performing processing of fast Fourier transform (FFT) with regard to the ECIR and the MFCC is a lower-order component of cepstrum which is acquired by applying the above-described processing to the ECTF.

For the first feature quantity, the impulse response or the transfer function calculated as the acoustical characteristic may be used as it is. In other words, feature extraction unit 105 may use a value of each time of the impulse responses as the first acoustical characteristic or a value of each frequency of the transfer functions as the feature quantity.

FIG. 11 is a graph illustrating a certain ECTF spectrum envelope. In the graph, the horizontal axis represents a frequency (Hz) and the vertical axis represents a sound pressure (both are logarithmic scales). The feature quantity of a user illustrated in the graph of FIG. 11 forms a first maximum around 1.5 kHz to 1.8 kHz, a first minimum around 3 kHz to 4 kHz, and a maximum again around 5 kHz to 8 kHz. The distance from the external opening of ear canal to the eardrum at the maximum time around 5 kHz to 8 kHz is approximately 2 to 3 cm on average. This shape or a numerical value associated with this is the feature quantity of the user. FIGS. 12A, 12B and 12C illustrate other graphs each representing the spectrum envelope. FIGS. 12A, 12B, and 12C illustrate graphs of the MFCC at first and 30th measurements relating a male A, a male B, and a female C, respectively. In the graph, circled areas represent features unique to each person. Note that, since it is a low sound (an audible range), it can be measured from the graph that a matching rate is high whether it is the first measurement or the 30th measurement.

Feature extraction unit 105 calculates, by a similar method, the feature quantity (second feature quantity) also from the second acoustical characteristic calculated by acoustical characteristic calculation unit 104.

In step S105, identification unit 106 stores the first feature quantity to be acquired from feature extraction unit 105 in first feature quantity storage 107. Further, identification unit 106 stores the second feature quantity to be acquired from feature extraction unit 105 in second feature quantity storage 108. Specifically, assuming that the feature quantity is the ECTF, for example, identification unit 106 stores the graph of 0 kHz to 20 kHz in the graph illustrated in FIG. 10 or a numerical value representing thereof as the first feature quantity in first feature quantity storage 107. Further, identification unit 106 stores the graph of 20 kHz to 40 kHz or a numerical value representing thereof as the second feature quantity in second feature quantity storage 108.

With the above, the processing of user registration ends.

Next, the operation of "2. user identification" is described with reference to the flowchart illustrated in FIG. 13. Note that steps S201 to S207 are first authentication processing using the first feature quantity in the audible range, and steps S208 to S215 are second authentication processing using the second feature quantity in the inaudible range.

First, when a person to be authenticated inserts earphone/microphone device 17 into a propagation path (for example, an ear canal entrance) being a part of his/her own head, sensor 18 detects a contact to the propagation path. In step S201, first acoustical signal generation unit 101 generates a signal in the audible range (a first acoustical signal) and transmits the generated signal to the propagation path via earphone 14 at every predetermined interval.

In step S202, acoustical signal measurement unit 103 receives and measures, via microphone 15, the acoustical signal after the first acoustical signal propagates a part of a user's head to be authenticated.

Figure 14:
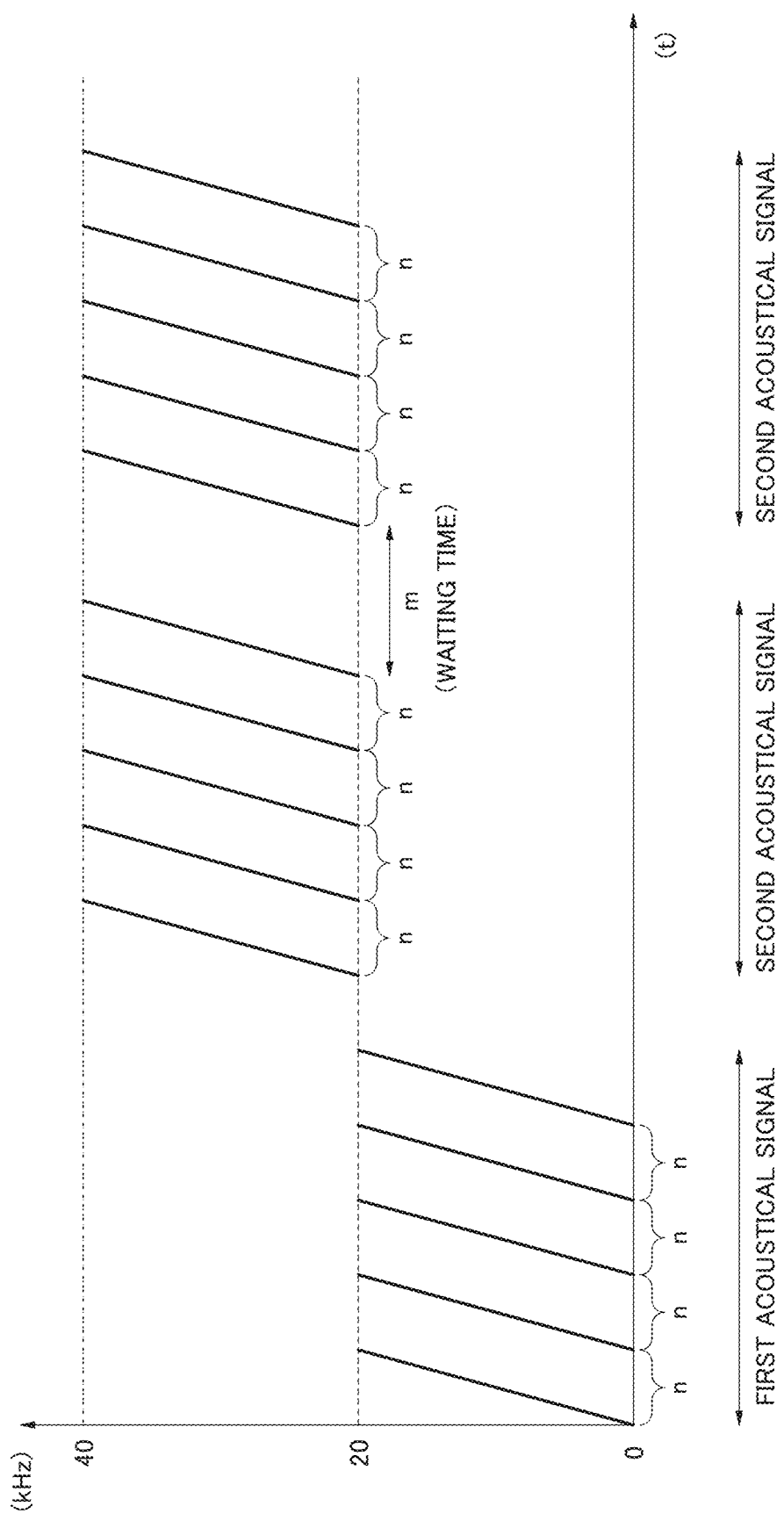
FIG. 14 is a chart illustrating the transmission timing of the acoustical signal to be transmitted.

FIG. 14 is a chart schematically illustrating a timing for transmitting the first acoustical signal and the second acoustical signal in steps S201 and S202. The vertical axis of the graph represents a frequency (kHz) of a sound wave and the horizontal axis represents time (t). First, first acoustical signal generation unit 101 transmits, toward the part of the user's head to be authenticated, the generated first acoustical signal in the audible range multiple times (5 times in FIG. 14) at every predetermined interval (n). Then, similarly to above-described first acoustical signal generation unit 101, second acoustical signal generation unit 102 generates the generated second acoustical signal in the inaudible range. Then, second acoustical signal generation unit 102 transmits, toward the propagation path being the part of the user's head to be authenticated via earphone 14, the generated second acoustical signal in the inaudible range multiple times (5 times in FIG. 14) at every predetermined interval (n).

In step S203, acoustical characteristic calculation unit 104 compares the first acoustical signal with the first acoustical signal measured by acoustical signal measurement unit 103. Then, acoustical characteristic calculation unit 104 calculates, from these changes, an acoustical characteristic (a first acoustical characteristic) of the acoustical signal when the first acoustical signal propagates the part of the user's head.

In step S204, feature extraction unit 105 calculates a feature quantity (first feature quantity) from the first acoustical characteristic calculated by acoustical characteristic calculation unit 104.

In step S205, identification unit 106 determines whether the first feature quantity acquired from feature extraction unit 105 coincides with any of the feature quantity stored in first feature quantity storage 107. In other words, identification unit 106 determines whether the user to be authenticated is a registered user.

In step S206, when identification unit 106 determines that the user to be authenticated is a registered user, the processing proceeds to step S207. When not coincident, the processing proceeds to step S215.

In step S207, identification unit 106 determines that the first authentication processing is successful and permits the registered user to access a predetermined device. Access to the predetermined device is, for example, login to a certain system and use of an application and database in the system after login. Usable applications and databases may be set differently for each registered user.

In step S208, when a predetermined time, for example, 10 seconds elapses, the processing proceeds to step S209, and the second authentication processing for continuing access permission is performed.

First, in step S209, second acoustical signal generation unit 102 transmits, toward the part of the user's head to be authenticated via earphone 14, the generated signal in the inaudible range (the second acoustical signal) at every predetermined interval.

In step S210, acoustical signal measurement unit 103 receives and measures, via microphone 15, the acoustical signal after the second acoustical signal propagates the part of the user's head to be authenticated.

In step S211, acoustical characteristic calculation unit 104 compares the second acoustical signal with the second acoustical signal measured by acoustical signal measurement unit 103. Then, acoustical characteristic calculation unit 104 calculates, from these changes, an acoustical characteristic (a second acoustical characteristic) of the acoustical signal when the second acoustical signal propagates the part of the user's head.

In step S212, feature extraction unit 105 calculates a feature quantity (second feature quantity) from the second acoustical characteristic calculated by acoustical characteristic calculation unit 104.

In step S213, identification unit 106 determines whether the second feature quantity acquired from feature extraction unit 105 coincides with any of the feature quantity stored in second feature quantity storage 108. In other words, identification unit 106 determines whether the user to be authenticated is a registered user.

In step S214, when identification unit 106 determines that the user to be authenticated is a registered user, the processing proceeds to step S215. When not coincident, the processing proceeds to step S216.

In step S215, identification unit 106 determines that the first authentication processing or the second processing fails, does not permit the user to be authenticated to access a predetermined device, and disconnects the access.

In step S216, identification unit 106 determines that the second authentication processing is successful and permits the registered user to continue the access to the predetermined device. Then, the processing proceeds to step S208, and the second authentication processing is performed again after a predetermined time has elapsed. Specifically, the second acoustical signal is transmitted again, when a waiting time (m) illustrated in FIG. 14 has elapsed after the first transmission of the second acoustical signal.

Note that the second authentication processing is repeated until sensor 18 detects the removal of earphone/microphone device 17 by the user.

On the contrary, when sensor 18 detects the insertion of earphone/microphone device 17, the processing of "1. user registration" is started again in a next processing step. The detection of insertion of earphone/microphone device 17 may be performed by using a sensor other than sensor 18.

For example, power-on of the earphone/microphone device may be asked to a user, each time earphone/microphone device 17 is inserted and removed. Alternatively, the insertion of earphone/microphone device 17 by a user may be detected by a change in acoustical signal to be measured by acoustical signal measurement unit 103.

In addition, identification unit 106 may use one-to-one authentication or one-to-N authentication. Herein, N is an integer equal to or more than 1.

Identification unit 106 compares, when using the one-to-one authentication, a feature quantity of a user to be authenticated (a feature quantity acquired by feature extraction unit 105) with a feature quantity of a registered user by one-to-one. At this time, an administrator of a personal authentication device may give a designation of which registered user to perform comparison to identification unit 106 in advance by using a user ID or the like. For example, identification unit 106 calculates, when using the one-to-one authentication, a distance between a feature quantity of a user to be authenticated and a feature quantity of a designated registered user. Then, identification unit 106 may determine that, when the distance is smaller than a threshold value, both are the same person. On the other hand, user identification unit 106 may determine that, when the calculated distance is greater than the threshold value, both are different persons.

Identification unit 106 compares, when using the one-to-N authentication, a user to be authenticated with N registered users. Identification unit 106 calculates distances between a feature quantity of the user to be authenticated and each of feature quantities of the N Then, identification unit 106 sets an appropriate registered users. threshold value and determines that the registered user of whom distance is the smallest within the threshold value is the user to be authenticated. Further, identification unit 106 can use a combination of the one-to-one authentication and the one-to-N authentication. In this case, user identification unit 106 may perform the one-to-N authentication, extract a registered user having the smallest distance, and then perform the one-to-one authentication by using the extracted registered user as a target to be compared. Further, as a distance scale to be calculated, a Euclid distance, a cosine distance, and the like can be considered, however, the distance scale is not limited to these.

Further, in the above description, an example is described in which first feature quantity storage 107 and second feature quantity storage 108 store feature quantities acquired from a plurality of persons in advance. However, a statistical model may be stored instead of the feature quantities. The statistical model may be, for example, by acquiring feature quantities for each user multiple times, the average value and variance value of the feature quantities or a relational expression calculated by using the average value and variance value. Further, the statistical model may be a gaussian mixture model (GMM), a support vector machine (SVM), a model using a neural network, or the like.

Modification Example of First Example Embodiment

Figure 13:
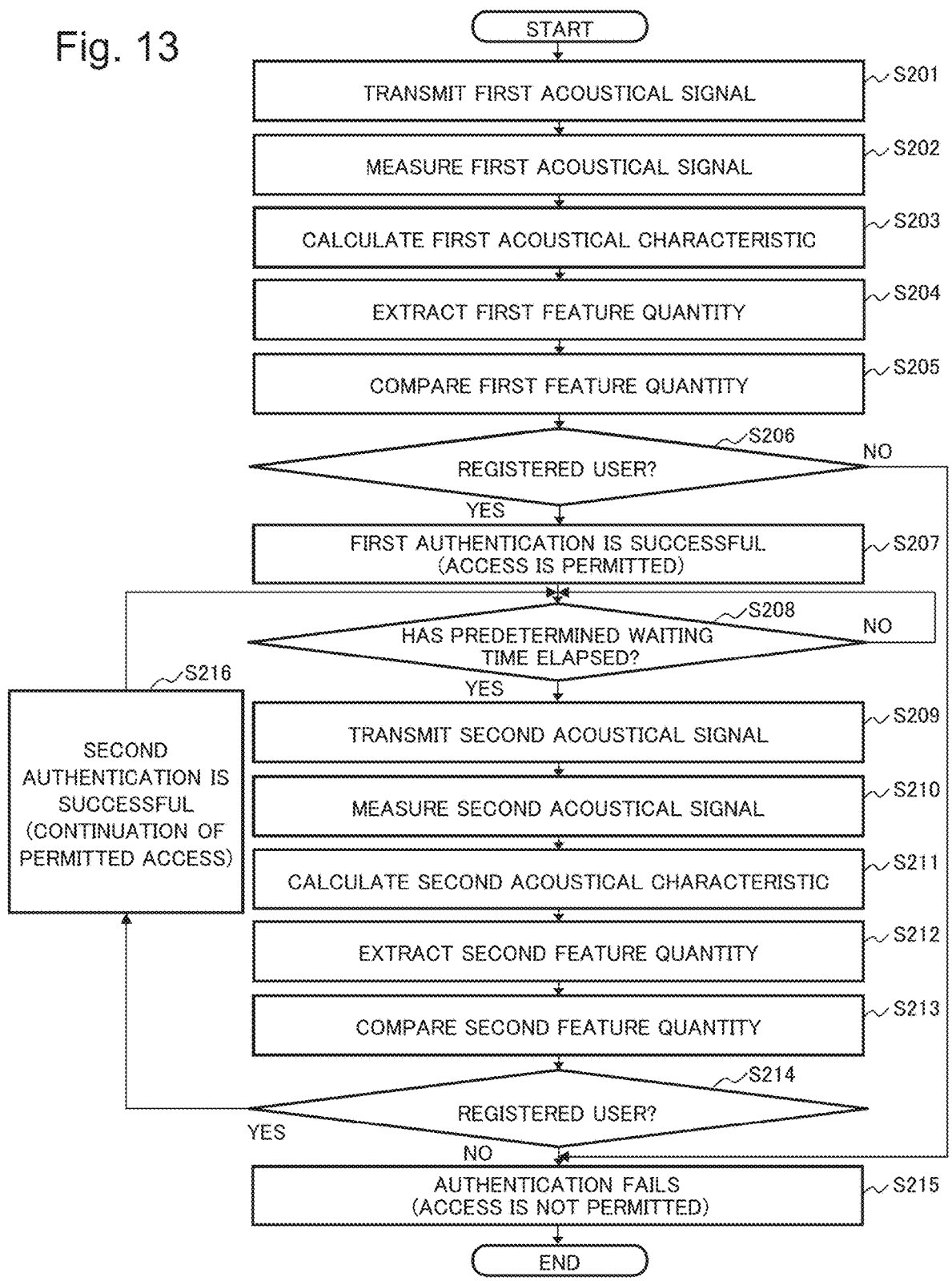
FIG. 13 is a flowchart illustrating an operation of a user identification in the personal authentication device according to the first example embodiment.

In step S207 of FIG. 13, identification unit 106 permits, when the first authentication processing is successful, a registered user to access a predetermined device. However, identification unit 106 may permit, when the first authentication processing and the initial second authentication processing are successful, the registered user to access the predetermined device. Specifically, identification unit 106 may permit, when being YES in step S214, the registered user to access the predetermined device (step S207). Modifying the design in this way enables the access permission to be performed more strictly, leading to enhancing authentication security.

Advantageous Effects of First Example Embodiment

As described above, with an earphone/microphone device as a single unit, the first example embodiment of the present invention is able to provide a personal authentication device and the like capable of quickly performing highly accurate authentication even at the time of insertion and preventing spoofing after authentication. The reason for this is as follows: Identification unit 106 performs, when a measured first acoustical signal satisfies a predetermined condition, first authentication of a person to be authenticated. Then, identification unit 106 performs, when a second acoustical signal satisfies a predetermined condition after the first authentication, second authentication for determining whether the person to be authenticated whose first authentication is successful is the same person. According to the present example embodiment, sensor unit 301 detects the insertion. Then, using this detection as a trigger, a propagation result of the first acoustical signal including the audible range is acquired and then a propagation result of the second acoustical signal including the inaudible range having a higher frequency than the audible range is acquired. Based on the results, identification unit 106 performs a determination (first authentication) on whether the user is a registered user. Then, identification unit 106 performs a determination (second authentication) on whether swapping identities (spoofing) of the user determined as the registered user in the first authentication has not occurred.

Second Example Embodiment

In authentication device 100 according to the first example embodiment, the second authentication processing is performed at a predetermined time interval. However, the second authentication processing over a long period of time requires electric power to continue outputting ultrasounds at every short time interval. The second authentication processing over a long period of time may also be a burden on a user depending on the constitution of the user who continues authentication for a long time. Therefore, according to a second example embodiment, personal authentication device 200 is described in which the number of times of second authentication processing is gradually reduced. This processing is performed for a user who have succeeded in second authentication processing a certain number of times or more, i.e., a user who have a history of not performing spoofing.

(Personal Authentication Device)

Figure 15:
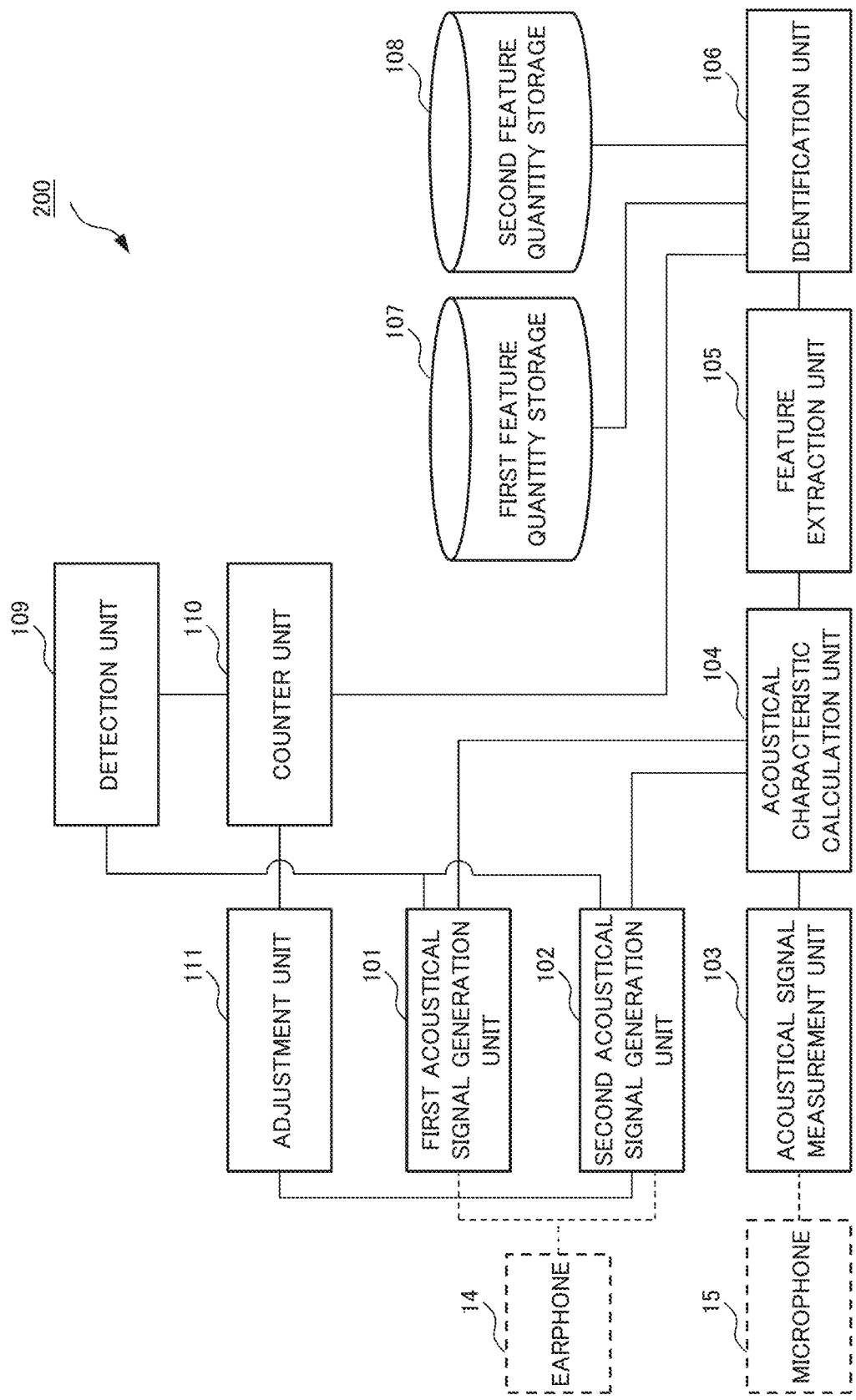
FIG. 15 is a block diagram illustrating a configuration example of a personal authentication device according to a second example embodiment of the present invention.

As illustrated in FIG. 15, personal authentication device 200 according to the second example embodiment of the present invention includes first acoustical signal generation unit 101, second acoustical signal generation unit 102, acoustical signal measurement unit 103, acoustical characteristic calculation unit 104, feature extraction unit 105, identification unit 106, first feature quantity storage 107 and second feature quantity storage 108, detection unit 109, counter unit 110 and adjustment unit 111.

Detection unit 109 detects insertion and removal of earphone/microphone device 17 (see FIG. 2) into and from the ear canal of a user. Detection unit 109 is, for example, a temperature detection sensor, an optical sensor, or a touch sensor. Detection unit 109 may detect insertion and removal by a change in an acoustical signal measured by acoustical signal measurement unit 103. The determination method is not limited to these.

Detection unit 109 outputs, when detecting the insertion of earphone/microphone device 17 (contact to a propagation path), the detection result to first acoustical signal generation unit 101. This is to notify a timing for transmitting a first acoustical signal being the start of first authentication. On the contrary, detection unit 109 restores, when detecting the removal of earphone/microphone device 17 (non-contact with the propagation path), a counter value of counter unit 110 to an initial value (e.g., 0). Then, detection unit 109 outputs the detection result to first acoustical signal generation unit 101 and second acoustical signal generation unit 102. This is to stop transmitting the acoustic signal and stop the first and second authentication.

Counter unit 110 counts the number of times when a user to be authenticated is identified as successful in the first authentication, the number of times when a second acoustical signal is transmitted, and the like. Counter unit 110 may count the number of times when the first acoustical signal is transmitted. Counter unit 110 may count the number of times of the first authentication processing and the second authentication processing.

As an example, when counting authentication processing, the count may be individually performed in such a way that the number of times of the first authentication processing is "once" and the number of times of the second authentication processing is "45 times". Alternatively, a first time of the authentication processing may be counted as the number of times of the first authentication processing and n-th time of second authentication processing may be calculated as (n−1) th time.

Adjustment unit 111 adjusts a waiting time interval for the second authentication processing, depending on the number of times of successful second authentication processing. For example, when the number of times of successful authentication is p times or more, the waiting time is delayed by (an initial value+q) seconds. Thus, the waiting time is lengthened depending on the magnitude of an absolute value relating to the number of times of successful authentication. As a specific example, when the number of times of successful authentication is 10 times or more, the waiting time is set to (the initial value+5) seconds. Further, when the number of times of successful authentication is 20 times or more, the waiting time is set to (the initial value+10) seconds. Adjustment unit 111 controls second acoustical signal generation unit 102 in such a way as to transmit the second acoustical signal at the adjusted waiting time interval.

Other devices are similar to the devices according to the first example embodiment.

(Operation of Personal Authentication Device)

Figure 16:
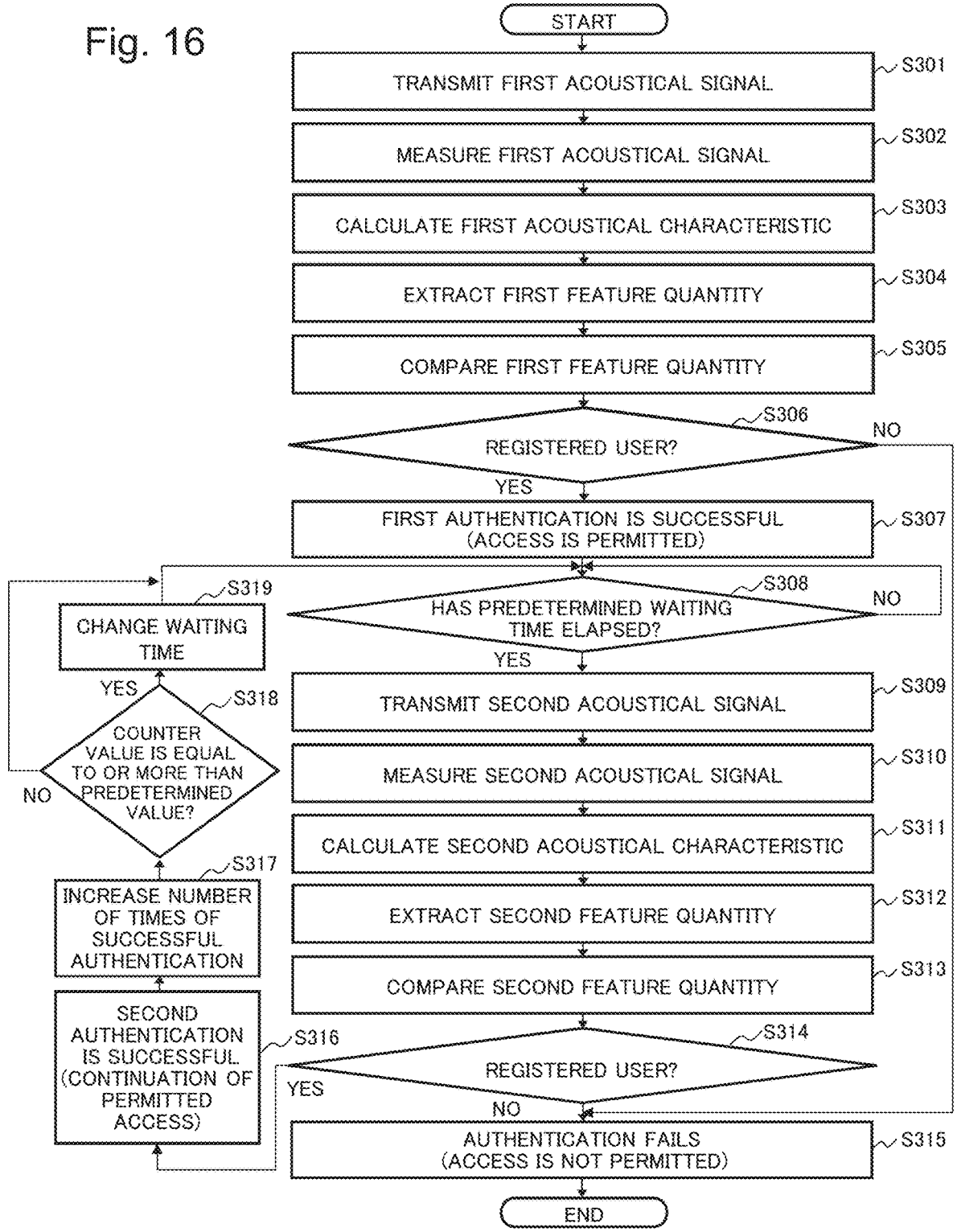
FIG. 16 is a flowchart illustrating an operation of a user identification in the personal authentication device according to the second example embodiment.

Next, an operation of the personal authentication device 200 according to the second example embodiment is described. The operation of the personal authentication device 200 is divided into "1. user registration" and "2. user identification". The operation of "1. user registration" is similar to the first example embodiment (FIG. 4). In the following, the operation of "2. user identification" is described with reference to the flowchart illustrated in FIG. 16.

First, when a person to be authenticated inserts earphone/microphone device 17 into the propagation path (e.g., the ear canal entrance) being a part of his/her own head, detection unit 109 constituting the sensor detects a contact to the propagation path. Hereinafter, operations in steps S301 to S316 are similar to the operations according to the first example embodiment (see steps S201 to S216 in the flowchart of FIG. 13).

In step S317, counter unit 110 counts, for example, the number of times of successful first authentication processing and successful second authentication processing in identification unit 106. The number of times of the first authentication processing and the number of times of the second authentication processing may be counted individually or may be counted together. Note that counter unit 110 may count the number of times of transmission of the acoustic signals from first acoustical signal generation unit 101 and second acoustical signal generation unit 102. Note that, when detection of the removal of earphone/microphone device 17 by detection unit 109 is notified, counter unit 110 restores the counter value to an initial value (for example, 0).

In step S318, adjustment unit 111 determines whether the number of times of successful authentication counted by counter unit 110 has reached a predetermined number of times or more. When the number of times is equal to or more than the predetermined number of times, the processing proceeds to step S319. When the number of times is not equal to or more than the predetermined number of times, the processing proceeds to step S308.

In step S319, adjustment unit 111 determines a waiting time interval for the second authentication processing, depending on the number of times of the successful authentication. Adjustment unit 111 may include a mathematical formula and a determination table for determining the waiting time interval. Adjustment unit 111 controls second acoustical signal generation unit 102 in such a way as to transmit the second acoustical signal at the determined waiting time interval. Thereby, second acoustical signal generation unit 102 transmits the generated second acoustical signal at the determined waiting time interval.

Modification Example of Second Example Embodiment

According to the second example embodiment, when removal of earphone/microphone device 17 is detected, the counter value of counter unit 110 is restored to an initial value. Then, the processing of "1. user registration" is restarted (i.e., the first acoustical signal is transmitted again). However, other than this, first acoustical signal generation unit 101 may perform transmission of the first acoustical signal as long as it is not a burden on a user. An example is when the number of times of the successful second authentication processing in counter unit 110 exceeds a predetermined number of times A, or when the number of times of success becomes a multiple of this A. By using this case as a trigger, first acoustical signal generation unit 101 may transmit the first acoustical signal.

Advantageous Effects of Second Example Embodiment

As described above, the second example embodiment of the present invention has similar advantageous effect to the first example embodiment. In other words, with an earphone/microphone device as a single unit, the second example embodiment is able to provide a personal authentication device and the like capable of quickly performing highly accurate authentication even at the time of insertion and preventing spoofing after authentication. Further, the waiting time interval for authentication processing is adjusted depending on the number of times of successful authentication. Then, adjustment unit 111 determines, depending on the number of times of successful authentication counted by counter unit 110, an interval for transmission of the second acoustical signal. Therefore, the number of times of the second authentication processing can be gradually reduced for a user who has a history of not performing spoofing. As a result, the electric power for outputting ultrasound can be eliminated, and the possibility of imposing a burden on a part for authentication in a user's body can be reduced.

Third Example Embodiment

Figure 17:
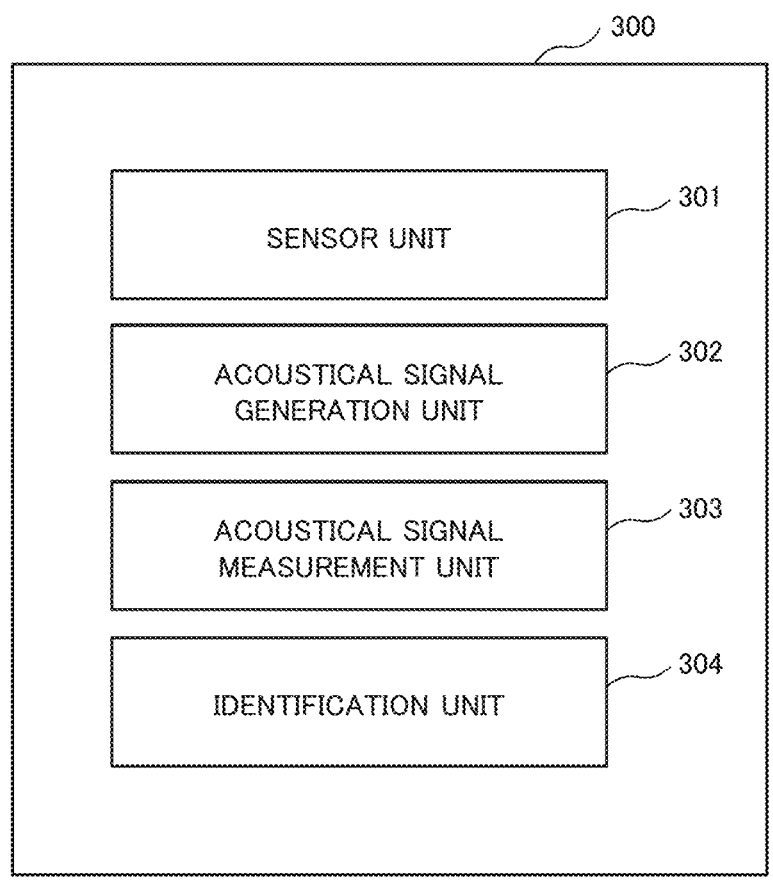
FIG. 17 is a block diagram illustrating a configuration example of a personal authentication device according to a third example embodiment of the present invention.

As illustrated in FIG. 17, personal authentication device 300 according to a third example embodiment of the present invention includes sensor unit 301, acoustical signal generation unit 302, acoustical signal measurement unit 303, and identification unit 304.

Sensor unit 301 detects a contact to a propagation path being a part of the head of a person to be authenticated.

Acoustical signal generation unit 302 generates, when sensor unit 301 detects the contact, a first acoustical signal including an audible range. Further, acoustical signal generation unit 302 generates a second acoustical signal in an inaudible range that has a higher frequency than the audible range and that does not include the audible range. Then, acoustical signal generation unit 302 transmits the generated first acoustical signal and second acoustical signal toward the propagation path.

Acoustical signal measurement unit 303 measures an acoustical signal after the first acoustical signal propagates the part of the head and measures an acoustical signal after the second acoustical signal propagates the part of the head.

Identification unit 304 performs, when the measured first acoustical signal satisfies a predetermined condition, first authentication of a person to be authenticated. Then, identification unit 304 performs, when the second acoustical signal satisfies a predetermined condition after the first authentication, second authentication for determining whether the person to be authenticated whose first authentication is successful is the same person.

With an earphone/microphone device as a single unit, the third example embodiment of the present invention is able to provide a personal authentication device and the like capable of quickly performing highly accurate authentication even at the time of insertion and preventing spoofing after authentication. The reason for this is as follows: Identification unit 304 performs, when the measured first acoustical signal satisfies a predetermined condition, the first authentication of a person to be authenticated. Then, identification unit 304 performs, when the second acoustical signal satisfies a predetermined condition after the first authentication, the second authentication for determining whether the person to be authenticated whose first authentication is successful is the same person. According to the present example embodiment, sensor unit 301 detects the insertion. Then, using this detection as a trigger, a propagation result of the first acoustical signal including the audible range is acquired and then, a propagation result of the second acoustical signal including the inaudible range having a higher frequency than the audible range is acquired. Based on the results, identification unit 106 performs a determination (first authentication) on whether the user is a registered user. Then, identification unit 106 performs a determination (second authentication) on whether swapping identities (spoofing) of the user determined as a registered user in the first authentication has not occurred.

According to the above-described example embodiments of the present invention, personal authentication devices 100, 200, and 300 may incorporate a personal authentication program inside earphone/microphone device 17 and perform authentication as a single device. As illustrated in FIG. 2, earphone/microphone device 17 and PC 11 are connected with each other and the entire operation may be controlled on PC 11 side. In other words, an application program for personal authentication on PC 11 side may be used under the following configuration.

(Information Processing Device)

Figure 18:
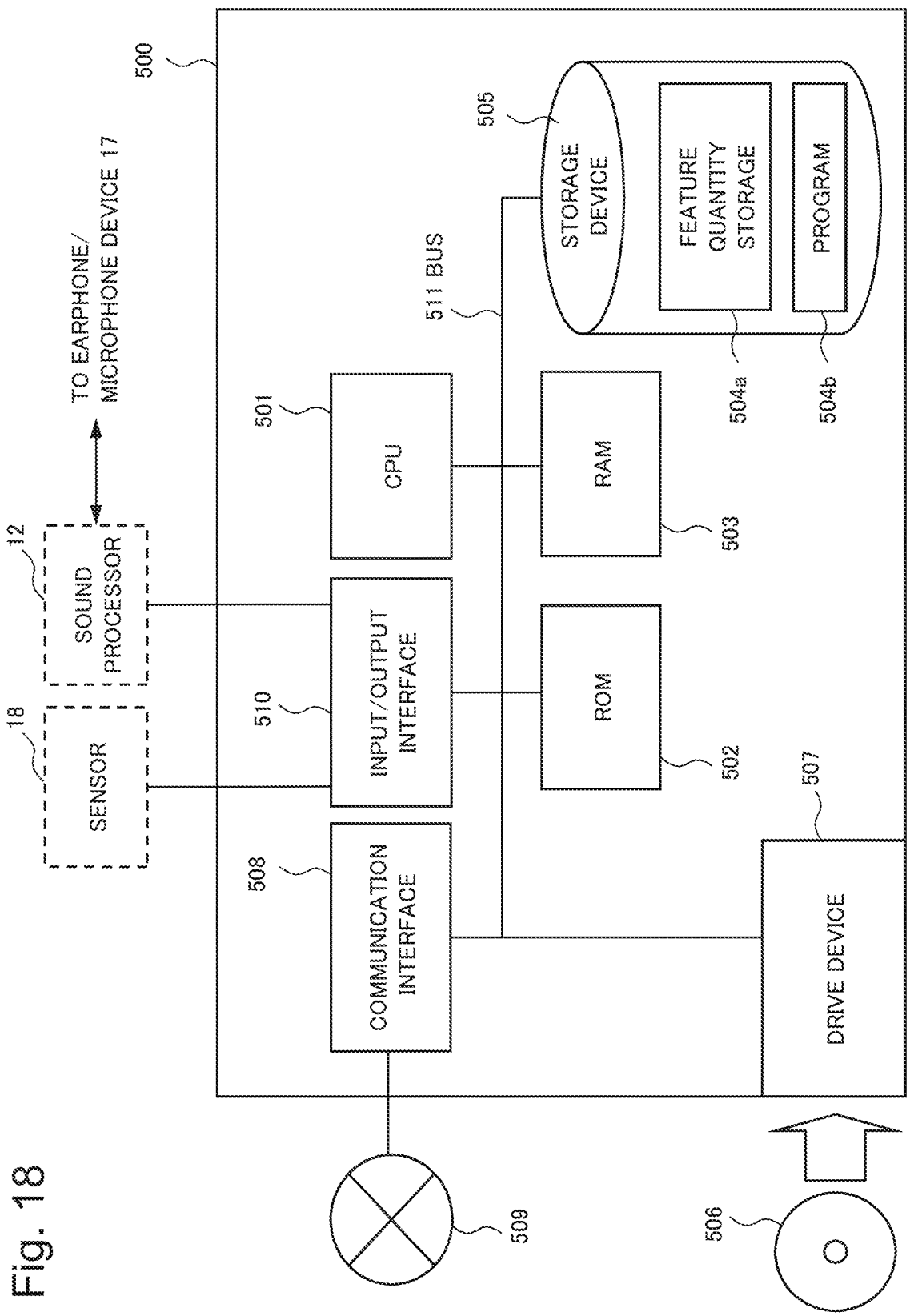
FIG. 18 is a block diagram illustrating a configuration example of an information processing device applicable to each example embodiment.

According to the above-described example embodiments of the present invention, a part or all of the components in the personal authentication device illustrated in FIGS. 1, 2 and the like can be also achieved by using, for example, any combination of information processing device 500 (PC 11) illustrated in FIG. 18 and a program. Information processing device 500 includes, as one example, the following configuration.

Central processing unit (CPU) 501
Read only memory (ROM) 502
Random access memory (RAM) 503
Program 504a to be loaded into RAM 503
Storage device 505 storing program 504b and other data
Drive device 507 for reading and writing recording medium 506
Communication interface 508 to be connected with communication network 509
Input/output interface 510 for inputting/outputting data
Bus 511 for connecting each component Each component of the personal authentication device according to each of the example embodiments of the present application is achieved by CPU 501 acquiring and executing program 504b that implements these functions. Program 504b which achieves the functions of each of components (e.g., an acoustical signal generation unit, an acoustical signal measurement unit, and an identification unit) of the personal authentication device is stored, for example, in storage device 505 or RAM 503 in advance. CPU 501 reads out program 504b as necessary. Note that program 504b may be provided to CPU 501 via communication network 509. Program 504b is stored in recording medium 506 in advance and may be provided to CPU 501 by drive device 507 reading the program.

Note that input/output interface 510 is connected to sensor 18, sound processor 12, and the like illustrated in FIG. 2. Storage device 505 includes feature quantity storage 504a (the first feature quantity storage and the second feature quantity storage) illustrated in FIGS. 1 and 15.

A method of achieving each device includes various modification examples. For example, the personal authentication device may be achieved by any combination of each separate information processing device for each component and a program. Alternatively, a plurality of components provided in the personal authentication device may be achieved by any combination of one information processing device 500 and a program.

Further, a part or the whole of each of the components of the personal authentication device may be achieved by another general-purpose or dedicated circuit, a processor, and the like, or a combination thereof. These components may be configured by a single chip, or may be configured by a plurality of chips to be connected via a bus.

A part or the whole of each of the components of the personal authentication device may be achieved by a combination of the above-described circuit and the like and a program.

When a part or the whole of each of the components of the personal authentication device is achieved by a plurality of information processing devices, circuits, or the like, the plurality of information processing devices, circuits, or the like may be arranged in a concentrated manner or a distributed manner. For example, an information processing device, a circuit, or the like may be achieved as a form in which each of a client-and-server system, a cloud computing system, and the like is connected via a communication network.

In the foregoing, the present invention has been described by referring to the present example embodiments. The present invention, however, is not limited to the aforementioned example embodiments. The configuration and details of the present invention can be subjected to various modifications which can be understood by those skilled in the art, within the scope of the present invention.

INDUSTRIAL APPLICABILITY

The present invention is applicable, for example, to a site that requires urgent and access to confidential information, for example, a system that requires quick and highly accurate authentication by ambulance team members, police officers, self-defense forces, and the like. Further, the present invention is also applicable to a personal authentication device and the like that authenticate a person by using an audio device. Further, the present invention is also applicable to a personalization system, a content right management system, a communication control system, and the like using such a personal authentication device or the like.

REFERENCE SIGNS LIST

11 PC
12 Sound processor
13 Microphone amplifier
14 Earphone
15 Microphone
16 User
17 Earphone/microphone device
18 Sensor
101 First acoustical signal generation unit
102 Second acoustical signal generation unit
103 Acoustical signal measurement unit
104 Acoustical characteristic calculation unit
105 Feature extraction unit
106 Identification unit
107 First feature quantity storage
108 Second feature quantity storage
109 Detection unit
110 Counter unit
111 Adjustment unit
100 Personal authentication device
200 Personal authentication device
300 Personal authentication device
301 Sensor unit
302 Acoustical signal generation unit
303 Acoustical signal measurement unit
304 Identification unit
500 Information processing device
501 CPU
503 RAM 504b Program
505 Storage device
506 Recording medium
507 Drive device
508 Communication interface
509 Communication network
510 Input/output interface
511 Bus

The invention claimed is:

1. A personal authentication device comprising:
a sensor configured to detect a contact with a propagation path being a part of a head of a person to be authenticated;
at least one memory configured to store instructions; and
at least one processor configured to execute the instructions to:
when the contact is detected, measure a first measurement acoustical signal and a second measurement acoustical signal, the first measurement acoustical signal being measured after transmitting a first acoustical signal in an audible range to the part of the head, the second measurement acoustical signal being measured after transmitting a second acoustical signal in an inaudible range having a higher frequency than the audible range to the part of the head;
acquire a first registered acoustical signal of the person in the audible range and a second registered acoustical signal of the person in the inaudible range, the first registered acoustical range and the second registered acoustical signal being registered before the contact;
perform first authentication authenticating the person by comparing the first measurement acoustical signal and the first registered acoustical signal; and
after success in the first authentication, perform second authentication by comparing the second measurement acoustical signal and the second registered acoustical signal.

2. The personal authentication device according to claim 1, wherein
the at least one processor is further configured to execute the instructions to
perform the second authentication when the first authentication is successful, and not perform the second authentication when the first authentication fails.

3. The personal authentication device according to claim 1, wherein
the at least one processor is further configured to execute the instructions to:
calculate a first acoustical characteristic from the first measurement acoustical signal;
calculate a second acoustical characteristic from the second measurement acoustical signal;
perform the first authentication, based on information including at least one of the first acoustical characteristic and a first feature quantity extracted from the first acoustical characteristic: and
perform the second authentication, based on information including at least one of the second acoustical characteristic and a second feature quantity extracted from the second acoustical characteristic.

4. The personal authentication device according to claim 1, wherein
the at least one processor is further configured to execute the instructions to
transmit the second acoustical signal after measuring the first measurement acoustical signal.

5. The personal authentication device according to claim 1, wherein
the at least one processor is further configured to execute the instructions to:
permit a predetermined access when a result of the first authentication is successful, or when a result of the first authentication and a result of the second authentication immediately after the first authentication are successful; and
continue permission of a predetermined access when a result of the second authentication performed after the second authentication immediately after the first authentication is successful.

6. The personal authentication device according to claim 3 further comprising
a storage configured to store at least one of the first and second acoustical characteristics and the first and second feature quantities being associated with one or a plurality of persons in advance, wherein
the at least one processor is further configured to execute the instructions to
identify whether to be a person successful in the first authentication, by comparing the calculated first and second acoustical characteristics with the first and second acoustical characteristics stored in the storage, or by comparing the extracted first and second feature quantities with the first and second feature quantities stored in the storage.

7. The personal authentication device according to claim 1, wherein
the at least one processor is further configured to execute the instructions to
count, using a counter, at least one of a number of times of success of the first authentication and a number of times of success of the second authentication, and
the sensor restores a counter value that is counted to an initial value when detecting the contact has been lost.

8. The personal authentication device according to claim 7 further comprising:
the at least one processor is further configured to execute the instructions to
adjust, when the counter acquires a number of times of successful authentication to be counted and determines that the number of times of successful authentication exceeds a predetermined number of times, a time interval after measuring the first acoustical signal until the second acoustical signal is transmitted in such a way as to be longer.

9. A personal authentication method comprising:
detecting, by a sensor, a contact with a propagation path being a part of a head of a person to be authenticated;
when the contact is detected, measuring a first measurement acoustical signal and a second measurement acoustical signal, the first measurement acoustical signal being measured after transmitting a first acoustical signal in an audible range to the part of the head, the second measurement acoustical signal being measured after transmitting a second acoustical signal in an inaudible range having a higher frequency than the audible range to the part of the head;
acquiring a first registered acoustical signal of the person in the audible range and a second registered acoustical signal of the person in the inaudible range, the first registered acoustical range and the second registered acoustical signal being registered before the contact;

performing first authentication authenticating the person by comparing the first measurement acoustical signal and the first registered acoustical signal; and after success in the first authentication, performing second authentication by comparing the second measurement acoustical signal and the second registered acoustical signal.

10. A non-transitory computer readable storage medium storing a program causing a computer to execute processing of:

detecting, by a sensor, a contact with a propagation path being a part of a head of a person to be authenticated;

when the contact is detected, measuring a first measurement acoustical signal and a second measurement acoustical signal, the first measurement acoustical signal being measured after transmitting a first acoustical signal in an audible range to the part of the head, the second measurement acoustical signal being measured after transmitting a second acoustical signal in an inaudible range having a higher frequency than the audible range to the part of the head;

acquiring a first registered acoustical signal of the person in the audible range and a second registered acoustical signal of the person in the inaudible range, the first registered acoustical range and the second registered acoustical signal being registered before the contact;

performing first authentication authenticating the person by comparing the first measurement acoustical signal and the first registered acoustical signal; and after success in the first authentication, performing second authentication by comparing the second measurement acoustical signal and the second registered acoustical signal.

* * * * *